United States Patent
Kizu et al.

(10) Patent No.: US 6,314,232 B2
(45) Date of Patent: Nov. 6, 2001

(54) DATA ALLOCATION METHOD, RECORDING MEDIUM WITH DATA RECORDED BY THE METHOD, AND DATA SERVER APPARATUS

(75) Inventors: Toshiki Kizu, Yokohama; Hiroshi Yao, Kawasaki; Tatsunori Kanai, Yokohama; Seiji Maeda, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/862,295

(22) Filed: May 22, 1997

(30) Foreign Application Priority Data

May 24, 1996 (JP) ...................................... 8-130232

(51) Int. Cl.[7] .............................. H04N 5/783; H04N 5/83
(52) U.S. Cl. ................................................ 386/68; 386/82
(58) Field of Search ............................. 386/46, 109, 711, 386/112, 124, 1, 33, 27, 40, 68, 69, 70, 82, 6, 125, 81; H04N 5/783, 5/83

(56) References Cited

U.S. PATENT DOCUMENTS

| | | | |
|---|---|---|---|
| 5,136,391 | * | 8/1992 | Minami ................................ 386/109 |
| 5,140,437 | * | 8/1992 | Yonemitsu et al. ................... 386/111 |
| 5,377,051 | * | 12/1994 | Lane et al. ........................... 360/33.1 |
| 5,442,454 | * | 8/1995 | Aoki et al. .............................. 386/96 |

OTHER PUBLICATIONS

Yen–Jen Oyang, et al.,"A Multimedia Storage System For On–Demand Playback", IEEE Transactions on Consumer Electronics, vol. 41, No. 1, Feb. 1995, pp. 53–64.

* cited by examiner

*Primary Examiner*—Robert Chevalier
(74) *Attorney, Agent, or Firm*—Oblon, Spivak, McClelland, Maier & Neustadt, P.C.

(57) ABSTRACT

A data allocation control method is applicable to a data recording apparatus for writing and/or reading data to/from a recording surface of a disciform recording medium. In this method, data to be recorded on the recording surface is divided into a plurality of data blocks to be consecutively dealt with. Next, allocation information for designating each location of the plurality of data blocks is generated such that a second data block next to a first data block included in the plurality of data blocks is located to keep a predetermined interval from a location of the first data block.

19 Claims, 19 Drawing Sheets

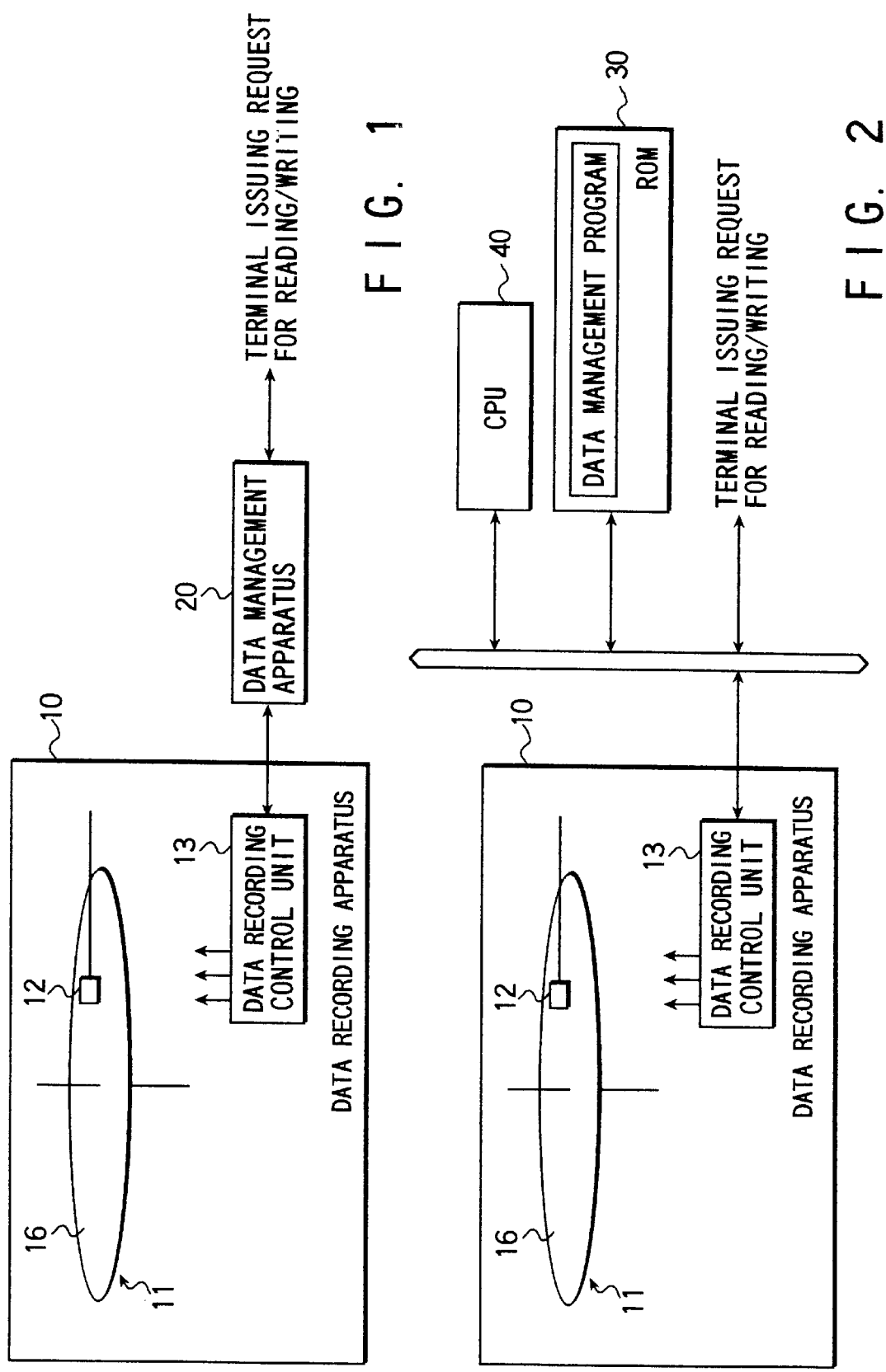

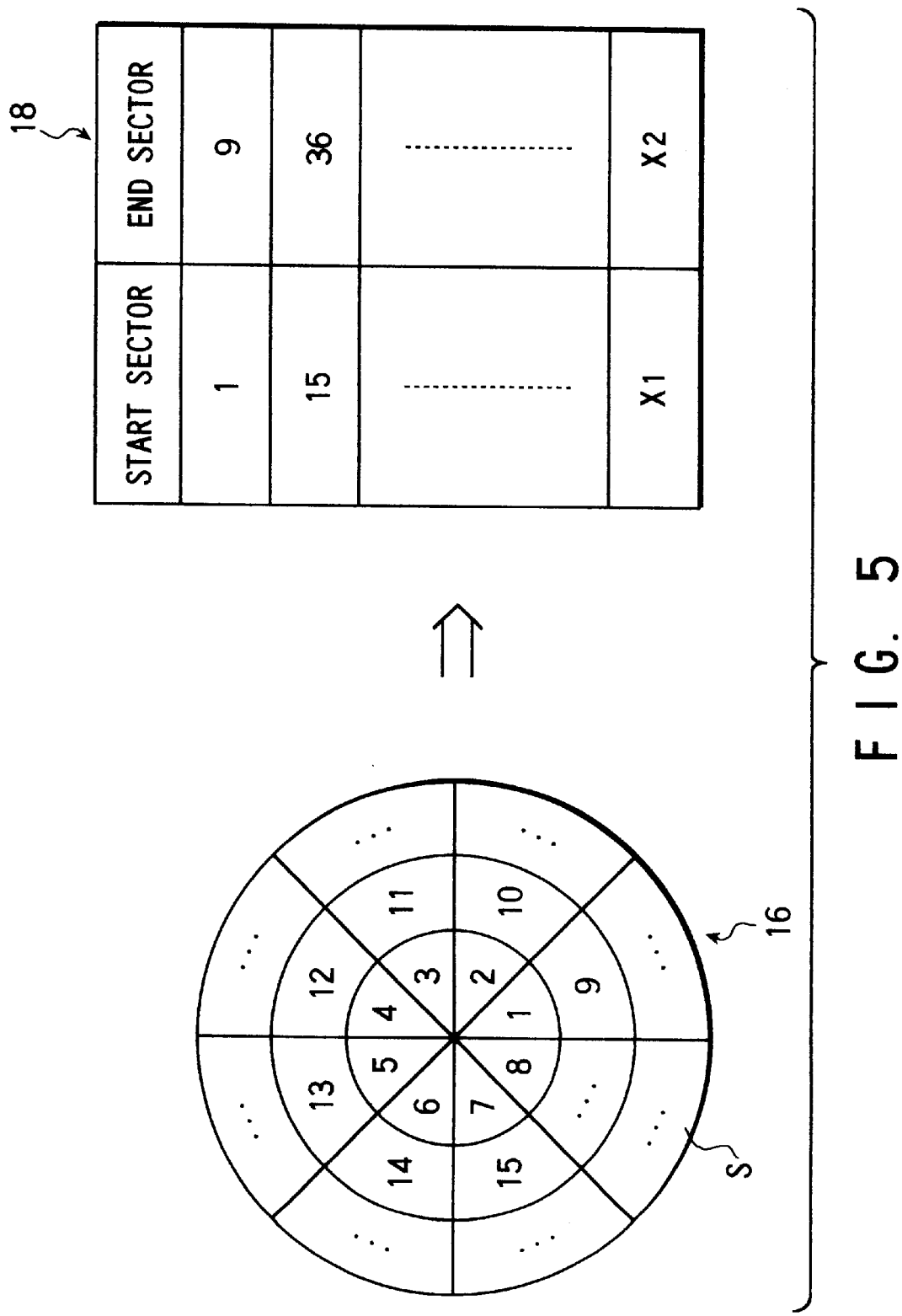
F I G. 5

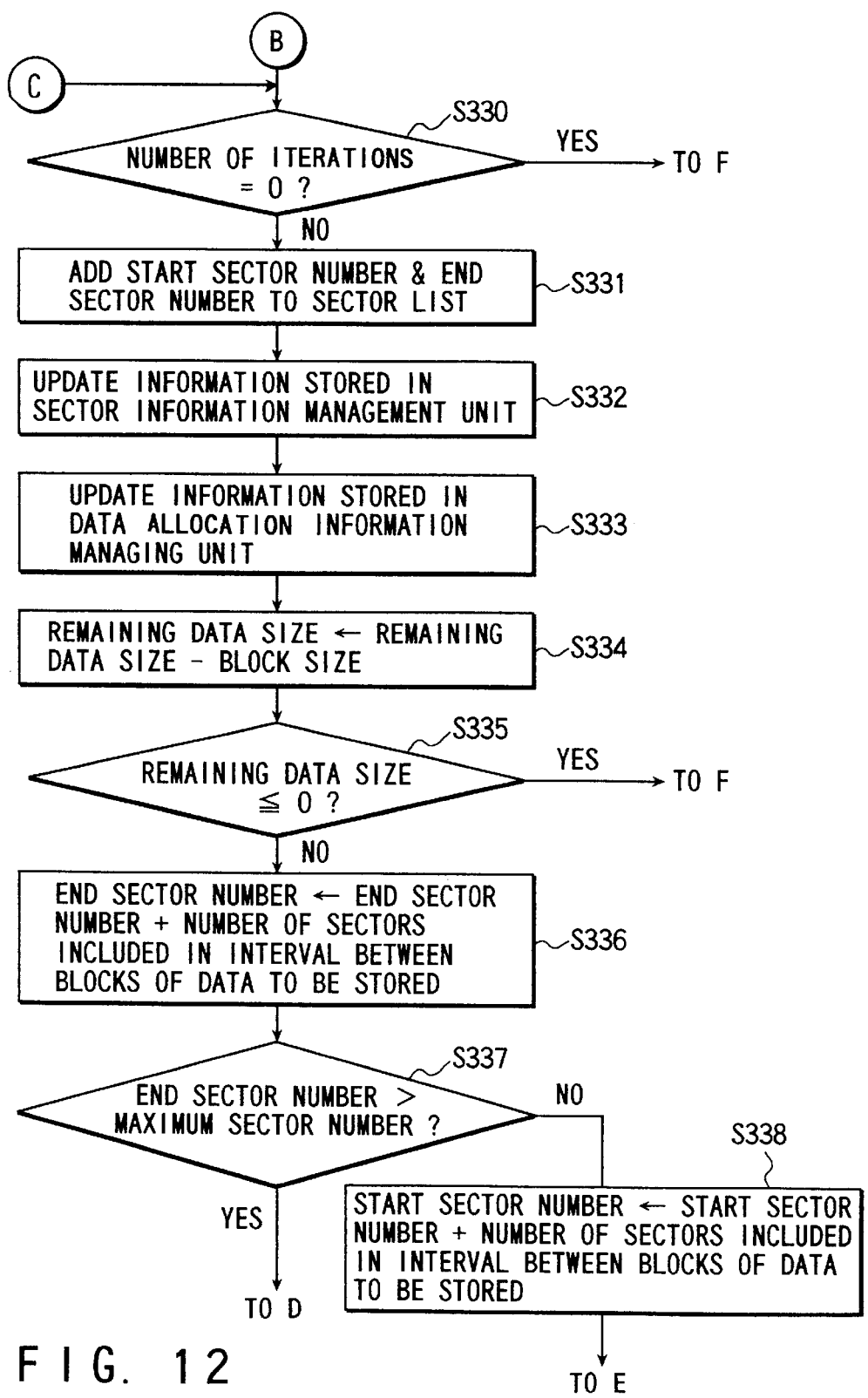
F I G. 12

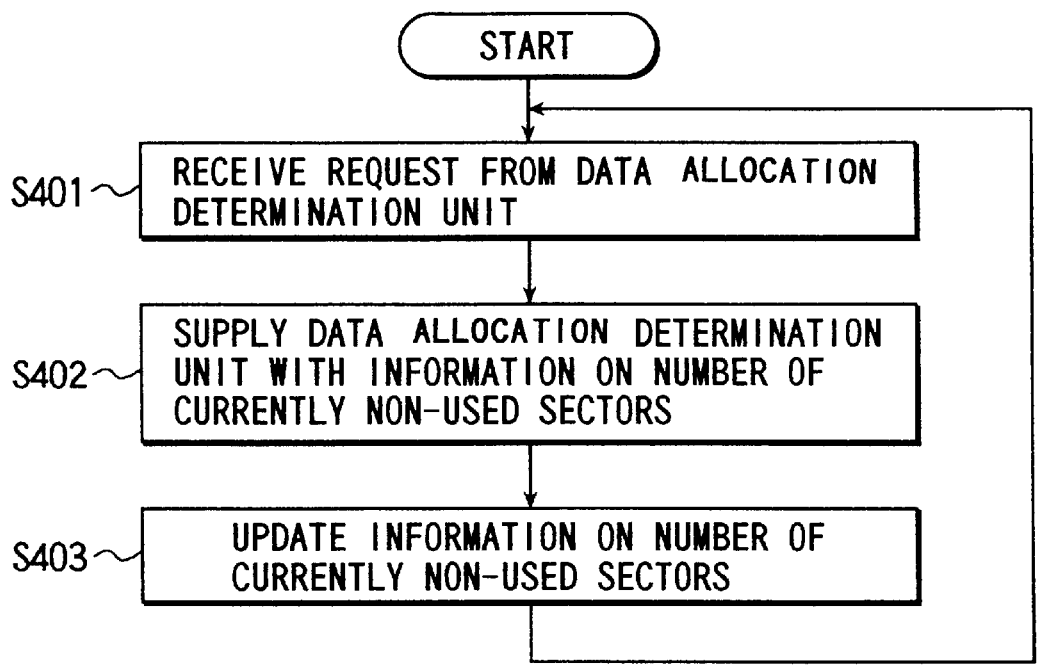
F I G. 15
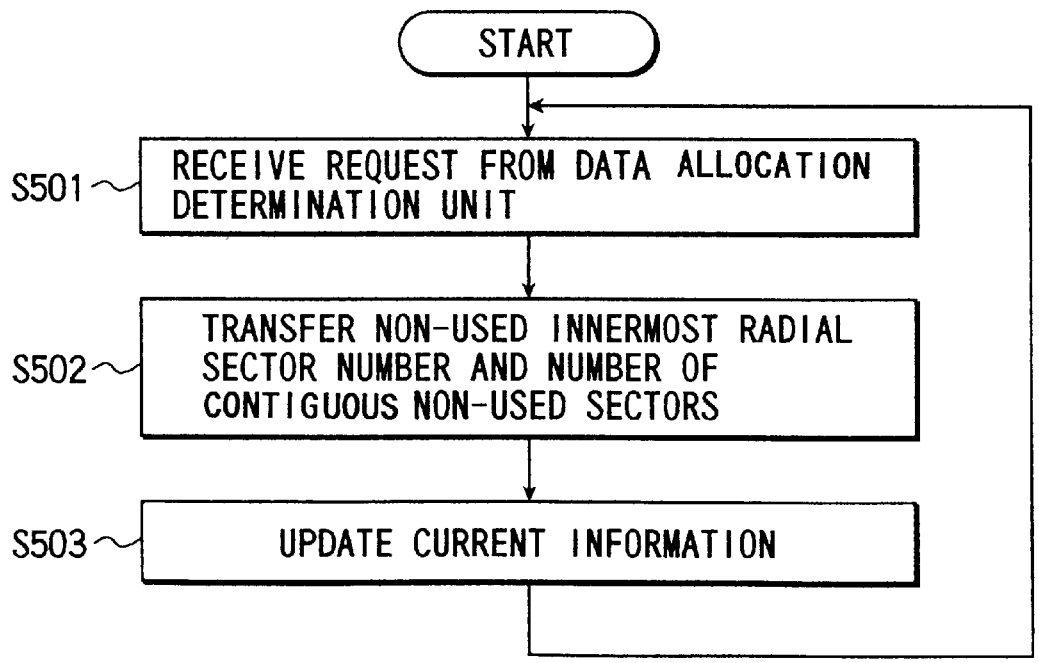
F I G. 16

| PARTITION | SECTOR NUMBER | BLOCK SIZE | NUMBER OF SECTORS BETWEEN ADJACENT BLOCKS OF DATA TO BE STORED |
|---|---|---|---|
| 0 | 0~$n_0$ | $b_0$ | $N_0$ |
| 1 | $n_0+1$~$n_1$ | $b_1$ | $N_1$ |
| 2 | $n_1+1$~$n_2$ | $b_2$ | $N_2$ |
| ---------- | ---------- | ---------- | ---------- |
| n-1 | $n_{n-2}+1$~$n_{n-1}$ | $b_{n-1}$ | $N_{n-1}$ |

F I G. 18

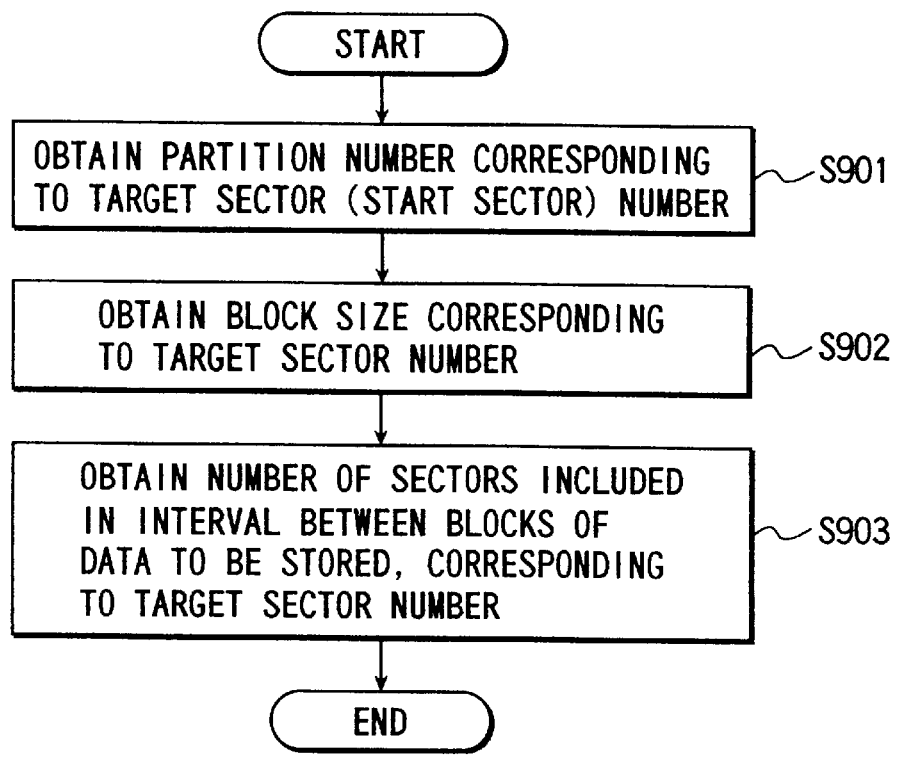
F I G. 22
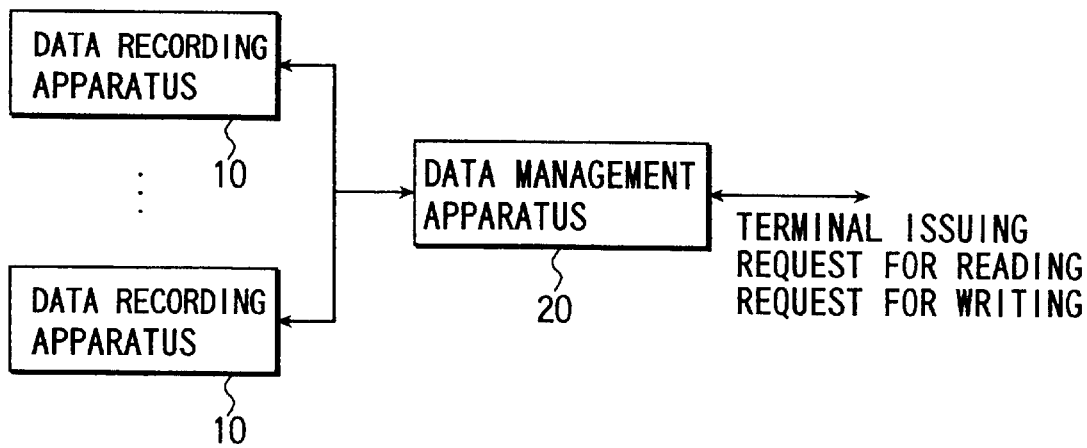
F I G. 24

DATA ALLOCATION METHOD, RECORDING MEDIUM WITH DATA RECORDED BY THE METHOD, AND DATA SERVER APPARATUS

BACKGROUND OF THE INVENTION

The present invention relates to a data allocation method applicable to a data storage apparatus equipped with a single or a plurality of rotary recording surfaces and heads for writing and reading data into and from the recording surfaces, also to a recording medium with data stored by the method, and to a data server apparatus for reading data stored in the data storage apparatus and transferring the read data to a terminal where a request for reading the data has issued.

Data recording apparatus includes magnetic tapes, magnetic disks, optical magnetic disks, etc. Magnetic disks, which are randomly accessible devices are advantageous in that they can be accessed at a higher speed than magnetic tapes, although the former are more expensive and have a smaller storage capacity than the latter.

The magnetic disk which has formally had a smaller storage capacity is advanced to have a larger storage capacity with low price by the development of recent technology, thereby its cost performance is improved to a grade in which a large amount of data in the form of, for example, moving picture can be stored. In addition, to the increase of the disk capacity, the band width of the network has been improved. These circumstances have enabled new services such as "video on demand"

Taking the "video on demand" service as an example, the operation of a data recording apparatus and a data allocation method employed therein will be explained.

In a service, such as the "video on demand", for distributing large amount of data of plural types to large number of users, data stored in data recording apparatuses like magnetic disks must be read at high speed within a predetermined time period. The rotary type data recording apparatus includes a magnetic disk, a magneto-optical disk (MO), or an optical disk, for example. In general, in a rotary type data recording apparatus, during a reading or writing process, a seek operation of moving the head to the target sector of the recording surface which records data to be read or written is performed, and a rotation waiting operation of waiting until the target sector of the recording surface is positioned just below the head is performed. After these process, data reading or writing is executed. Therefore, to read the data at high speed, the time required for the seek operation and the rotation waiting operation must be shortened.

In the conventional data recording apparatus, in case of allocating a series of data items (e.g., video data, audio data, text data, still picture, program data, etc.), which are written in a continuous memory area. With this data allocation, when the plural different types of video data items in the data recording apparatus are simultaneously and sequentially read in a time division manner, the inner radial portion and the outer radial portion of the data recording apparatus are alternately accessed if some video data items are stored together in an inner radial portion of the data recording apparatus and other video data items are stored together in an outer radial portion thereof. Consequently, there is a problem that a situation where the distance for seeking target sectors continuously increases and therefore the entire time for the data access inevitably increases.

The above problems in the conventional art are summarized as follows. In the conventional apparatus, when a series of data items are allocated, these are written in a continuous area. Accordingly, when the plural different types of video data items in the data recording apparatus are simultaneously and sequentially read in a time division manner, there occurs a situation where the distance for seeking target sectors continuously increases and therefore the entire time for the data access inevitably increases if the video data items are separately stored in an inner radial portion of the data recording apparatus and in an outer radial portion thereof.

BRIEF SUMMARY OF THE INVENTION

Accordingly, it is an object of the present invention to provide a data allocation method, a recording medium with data recorded by the method, and a data server apparatus for avoiding a succession of a situation where the distance for seeking target sectors continuously increases, thereby reducing the required average seek time and increasing the speed of reading and/or writing data.

According to one aspect of the present invention, there is provided a data allocation control method applicable to a data recording apparatus for writing and/or reading data to/from a recording surface of a disciform recording medium, the method comprising the steps of: dividing data to be recorded on the recording surface into a plurality of data blocks to be consecutively dealt with; and generating allocation information for designating each location of the plurality of data blocks, such that a second data block next to a first data block included in the plurality of data blocks is located to keep a predetermined interval from a location of the first data block.

According to another aspect of the present invention, there is provided a data allocation control method applicable to a data recording apparatus for writing and/or reading data to/from a recording surface of a disciform recording medium, the method comprising the steps of: dividing data to be recorded on the recording surface into a plurality of data blocks to be consecutively dealt with; and generating size information for designating the size of each data block, such that the data block to be located in a region where access speed is higher has a large size and the data block to be located in a region where the access speed is lower has a small size.

According to another aspect of the present invention, there is provided a disciform recording medium applicable to a data recording apparatus for writing and/or reading data to/from a recording surface of the recording medium, data allocation for the recording medium comprising the steps of: dividing data to be recorded on the recording surface into a plurality of data blocks to be consecutively dealt with; and generating allocation information for designating each location of the plurality of data blocks, such that a second data block next to a first data block included in the plurality of data blocks is located to keep a predetermined interval from a location of the first data block.

According to another aspect of the present invention, there is provided a data server apparatus applicable to a data recording apparatus for writing and/or reading data to/from a recording surface of a disciform recording medium, the data server apparatus comprising: means for dividing data to be recorded on the recording surface into a plurality of data blocks to be consecutively dealt with; means for generating allocation information for designating each location of the plurality of data blocks, such that a second data block next to a first data block included in the plurality of data blocks is located to keep a predetermined interval from a location of the first data block; means for controlling the data recording apparatus to place each data block in accordance with the allocation information; and means, responsive to a request for reading data, for reading data blocks from the recording surface and transferring data comprised of the read data blocks to a terminal where the request has issued.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram, showing a basic structure of a data recording apparatus according to each embodiment of the invention;

FIG. 2 is a block diagram, showing a modification of the basic structure of the data management apparatus;

FIG. 5 is a view, illustrating another method for managing the state of use of each sector;

FIG. 12 is a flowchart, illustrating part of an operation of the data allocation determination unit;

FIG. 15 is a flowchart, illustrating an operation of a sector information management unit;

FIG. 16 is a flowchart, illustrating an operation of a data allocation information managing unit;

FIG. 18 is a format of a conversion table stored in the data allocation determination unit in which sector numbers, block sizes, and the numbers of sectors between data blocks;

FIG. 22 is a flowchart, illustrating processing performed by the data allocation determination unit using the conversion table;

FIG. 24 is another basic structure of the data recording apparatus according to the embodiments of the invention.

DETAILED DESCRIPTION OF THE INVENTION

Figure 3:
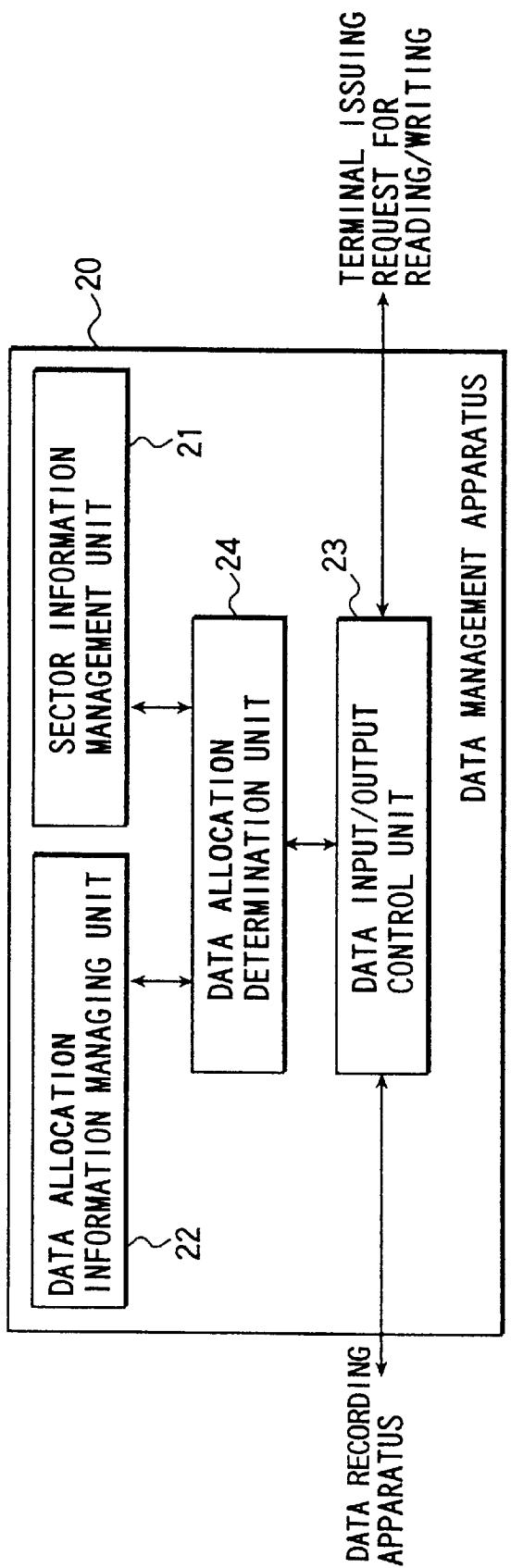
FIG. 3 is a view, showing a structure of a data management apparatus.

The embodiments of the invention will be described with reference to the accompanying drawings.

(First Embodiment)

FIG. 1 shows a basic structure of a data recording apparatus according to the first embodiment of the invention.

This data recording apparatus of the first embodiment is equipped with a data recording apparatus 10 including a number n (n: an integer not less than 1) of disciform recording media 11, heads 12 for data-reading/writing, which is provided for each recording surface 16 of the disciform recording media 11, and a data recording control unit 13 for controlling to position the heads 12 and controlling data writing/reading. The data recording apparatus is also equipped with a data management apparatus 20 for managing data recorded on the recording surfaces 16 of the data recording apparatus 10 and instructing data recording in the recording surfaces 16.

The data recording apparatus 10 has functions for positioning a head 12 by rotating a disciform recording medium 11 and by moving the head 12 in a radial direction of the recording medium 11, and writing and/or reading data to/from a recording surface to which the head 12 is positioned.

The disciform recording medium 11 of the data recording apparatus 10 are provided for recording data. Data recording apparatuses which are applicable to this embodiment include a magnetic disk, an optical disk, a magneto-optical disk, a phase-variable optical disk, a CD-ROM, a CD-R, etc. In the magnetic disk, for example, a metallic disk coated with a magnetic material is used as the disciform recording medium 11. The recording surface 16 of the disciform recording medium 11 is divided into small areas, each of which is called a "sector". Reading or writing data is performed in units of a sector.

There is a case where only a single disciform recording medium is employed, and a case where a plurality of disciform recording media 11 are employed. Moreover, there is a case where only a single side of the disciform recording medium 11 is used as a recording surface 16, and a case where both sides are used as recording surfaces 16. In the FIG. 1 case, there is provided only a single disciform recording medium 11, and only one side thereof is used as a recording surface 16.

Each head 12 is used to read and/or write data from/to the recording surface 16 of the disciform recording medium 11. Usually, a number of heads 12 corresponding to the number of recording surfaces 16 are employed. In addition, there is a case where a single head is used to both read and write data, and a case where there are provided heads dedicated to data writing and to data reading, respectively.

The data recording control unit 13 has a function for controlling the rotation speed of the disciform recording medium 11 (i.e., the recording surface 16), controlling the positioning of the head 12, and controlling the head 12 so as to read/write data, and also has a function for reading and writing data from/to a particular sector.

The data recording control unit 13 positions the head 12 to each of the locations designated by information supplied from the data management apparatus 20 when being controlled by the data management apparatus 20.

The data recording apparatus 10 including the disciform recording medium 11, the head 12 and the data recording control unit 13 corresponds to, for example, a hard disk device.

On the other hand, the data management apparatus 20 manages the state of use of each sector on the recording surface 16 of the data recording apparatus 10, the type of data, and required reading/writing speed. Further, upon receiving a request for writing data, the apparatus 20 supplies the data recording control unit 13 with an instruction to write data into an appropriate sector. Upon receiving a request for reading data, the apparatus 20 supplies the data recording control unit 13 with an instruction to read data from a sector storing the data.

The functions of the data management unit 20 can also be realized by software programs. Specifically, as is shown in FIG. 2, the processing in the data management unit 20 can be realized by, for example, causing a host-side computer for controlling the hard disk to read, from a memory 30 such as a ROM, etc., an application program (a data management program having the same function as the data management apparatus 20) which describes a necessary procedure, and then causing a CPU 40 to execute the program.

Furthermore, a subject which can supply the data management apparatus 20 with a request for reading or writing is arbitrarily provided. For example, to realize the data management apparatus 20 by a software program, a request may be issued directly from an external terminal which executes the program or via another program (process) executed by the same computer, or may be issued directly from the another program.

A more detailed structure of the data management apparatus 20 will now be described.

FIG. 3 shows the data management apparatus 20 of the embodiment.

The data management apparatus 20 of the first embodiment comprises a sector information management unit 21, a data allocation information managing unit 22, a data input/output control unit 23 and a data allocation determination unit 24.

Figure 4:
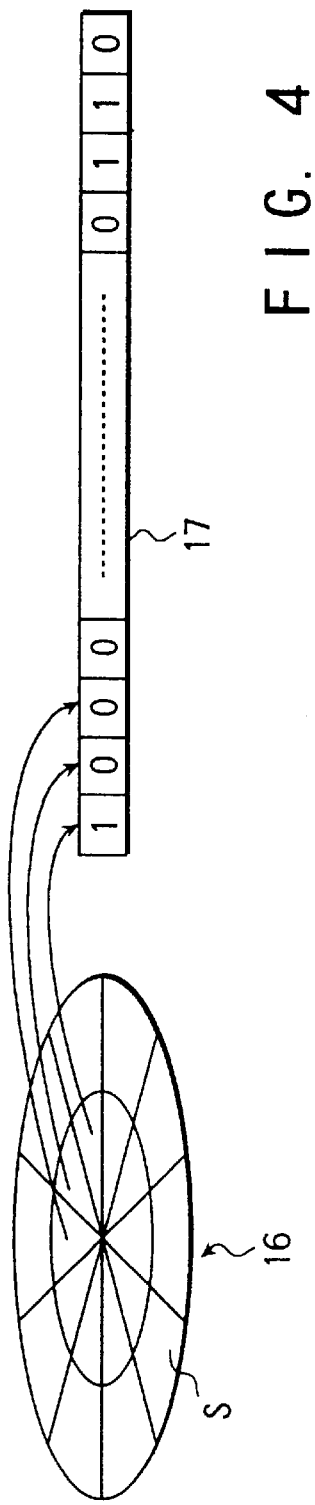
FIG. 4 is a view, illustrating a method for managing the state of use of each sector.

The sector information management unit 21 manages the state of use of each sector on the recording surface 16 of the recording medium 11. The methods of managing the state of use are as follows: (1) As is shown in FIG. 4, there is provided a method for enabling bit (setting 1) for a used sector S and disabling bit (setting 0) for a non-used sector S, using a bit map 17 having information corresponding to each sector S; and (1) As is shown in FIG. 5, there is provided a method for assigning an identifier to each sector S on the recording surface 16, and managing each sector s being used, using a list (sector's state-of-use management list) 18 in which each sector S being used is denoted by a sector number (sector identifier). The data management apparatus 20 will be further described, supposing that the above method (2) is employed.

The sector information management unit 21 accepts a request from the data allocation determination unit 24 and supplies information which includes "the number (ID) of a first non-used (vacant) sector" in a predetermined direction (a radial direction of the recording medium 11) from a reference position on the recording surface 16 (e.g., an outermost or innermost radial portion of the recording medium 11), and also includes "the number of currently non-used sectors". In this case, concerning the non-used sector number, the number of an innermost or outermost non-used sector on the recording surface 16 is supplied. Alternatively, the number of the non-used sector may be supplied, which is situated inwardly or outwardly closest to an intermediate position between innermost and outermost radial positions on the recording surface. Hereinbelow, suppose that the number of an innermost non-used sector is supplied.

Figures 6, 7:
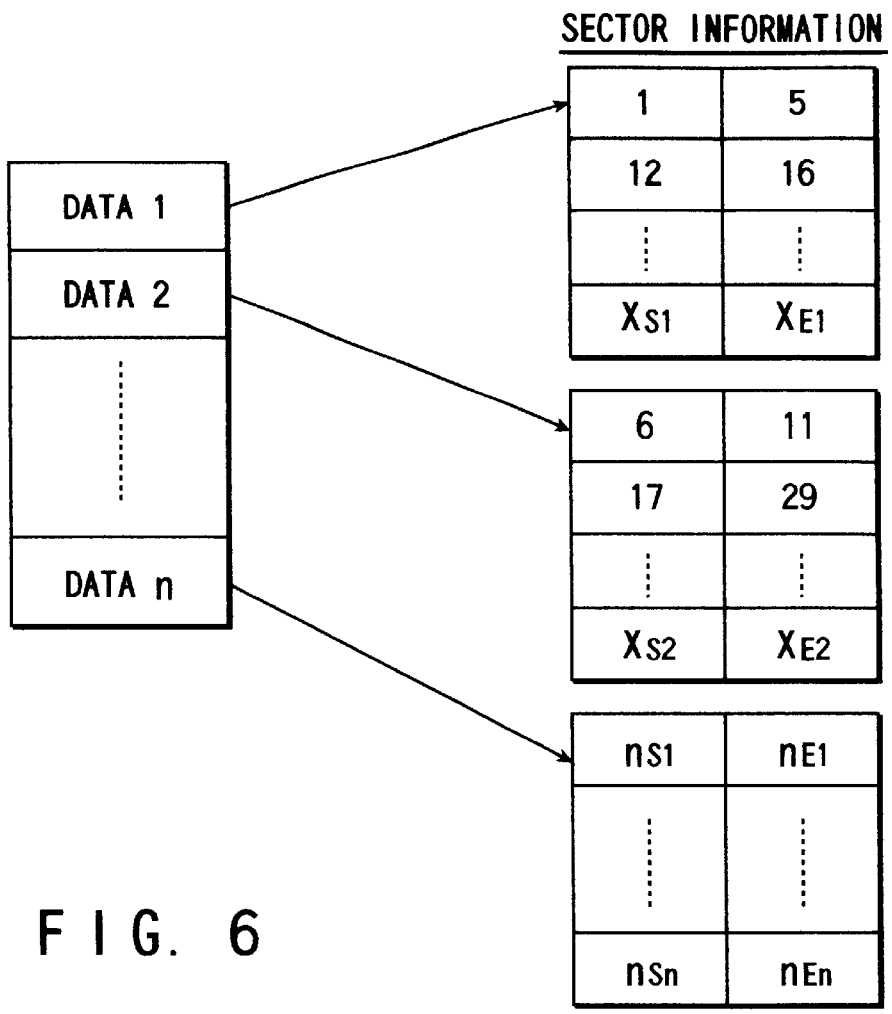
FIG. 6 is a view, showing a format of data/sector information to be managed by a data allocation information managing unit.
FIG. 7 is a view, showing a format of a sector list to be supplied from a data allocation determination unit.

The data allocation information managing unit 22 manages data/sector information as to which sector of the recording surface 16 in the data recording apparatus 10 records which data item. For example, as shown in FIG. 6, a management method of holding a list showing a pair of a start sector number and an end sector number of sectors being used for each data block, may be adopted.

The data/sector information is updated by the data allocation determination unit 24 invoked when the data input/output control unit 23 has received a request for writing data. Further, the data/sector information is referred to when the data input/output control unit 23 has received a request for reading data.

The data input/output control unit 23 performs input/output processing in the data recording apparatus 10, upon receiving a request for input/output of data. When receiving a request for writing data (a request for inputting data), the data input/output control unit 23 controls the data allocation determination unit 24 so as to request a sector list indicative of the position in which the data is to be placed. The data input/output control unit 23 also controls the data recording control unit 13 so as to write the data into an appropriate sector.

The data allocation determination unit 24 is invoked by the data input/output control unit 23 so as to determine, based on an instruction from the data input/output control unit 23, in which sector on the recording surface 16 a block of data should be stored, and to supply a determination result to the data input/output control unit 23. In other words, when the data allocation determination unit 24 has received data on the size of to-be-stored data from the data input/output control unit 23, it refers to the information from the data allocation information managing unit 22 and the sector information management unit 21, and supplies the data input/output control unit 23 with the sector list indicative of the order of sectors in which data blocks should be stored.

The sector list supplied from the data allocation determination unit 24 has a format showing sector numbers placed in the order in which sectors denoted by the sector numbers store respective data blocks, or a format showing each pair of "start sector number" and "end sector number" as shown in FIG. 7. If, however, the size of data is too large to store the data in the non-used sectors, the data allocation determination unit 24 returns a "recording impossible" answer.

Data to be read from and written into the recording surface 16 is transferred between the data recording apparatus 10 and an external terminal via the data input/output control unit 23.

Referring then to the flowcharts of FIGS. 8A and 8B, the basic operation of the entire data recording apparatus will be described.

Figure 8A:
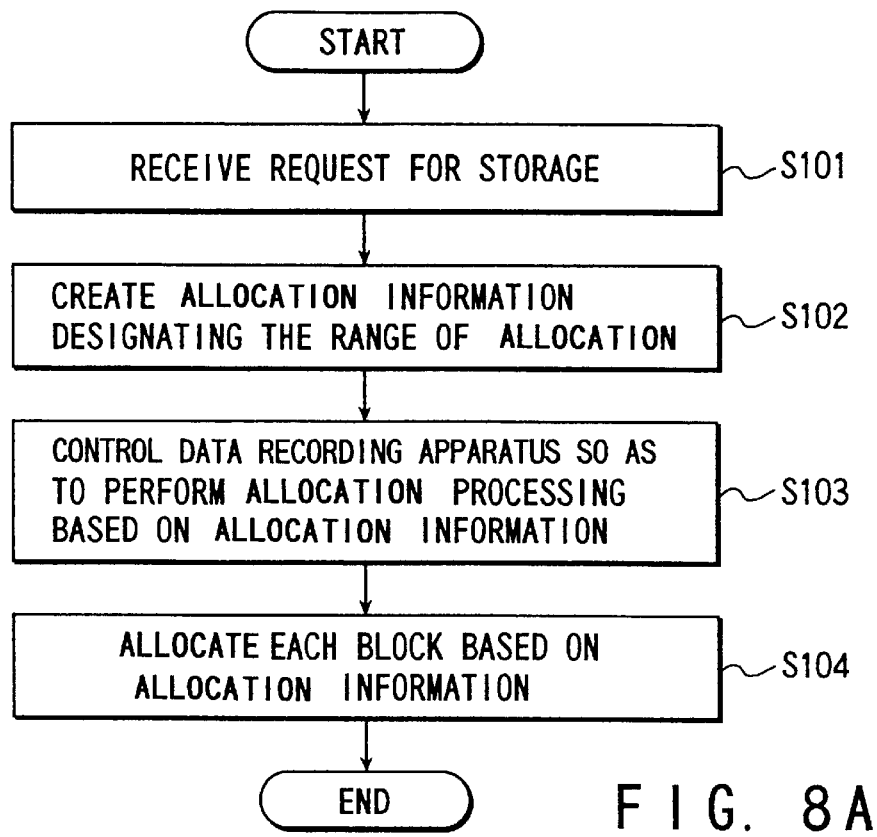
FIGS. 8A and 8B show flowcharts, useful in explaining the basic operation of a data recording apparatus.

FIG. 8A illustrates the procedure performed when a request for writing data is issued from a terminal. Upon receiving a request for writing data from the terminal (step S101), the data management apparatus 20 refers to the size of the data, thereby creating allocation information which designates the range of allocation on the recording surface 16 of the data to be stored in units of a block (step S102). The data management apparatus 20 then controls the data recording apparatus 10 in accordance with the created allocation information so as to sequentially place data blocks on the recording surface 16 (step S103). The data recording control unit 13 of the data recording apparatus 10 then places the data blocks based on the allocation information from the data management apparatus 20 (step S104).

Figure 8B:
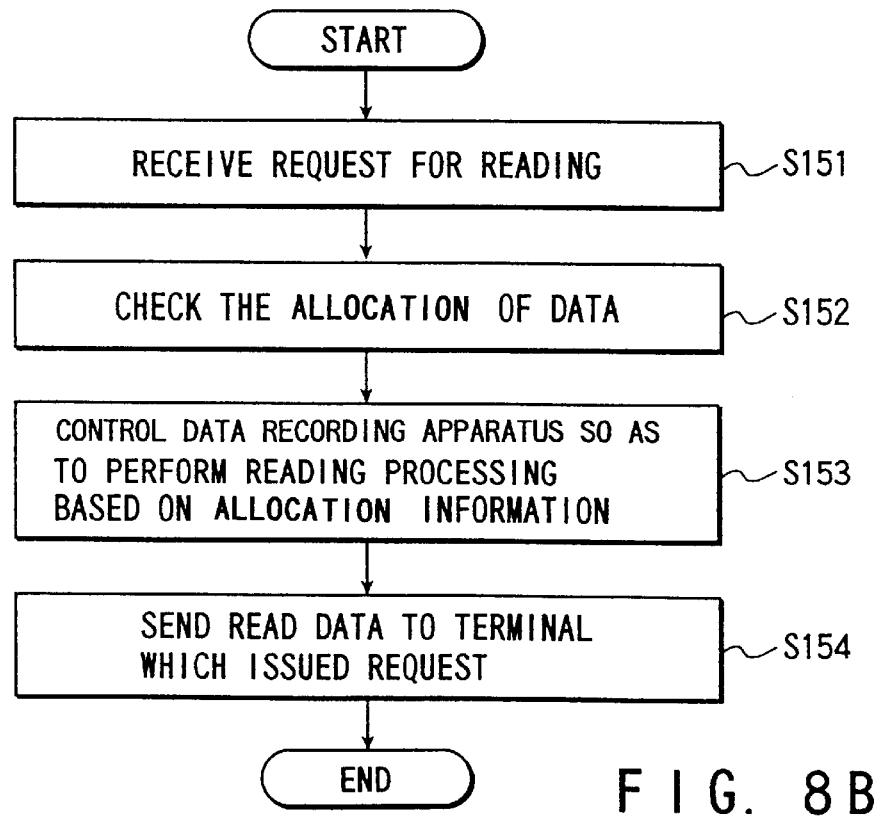

FIG. 8B illustrates the procedure performed when a request for reading data is issued from a terminal. Upon receiving a request for reading data form the terminal (step S151), the data management apparatus 20 determines the position of the data stored in units of a block in the recording surface 16 (step S152), thereby controlling the data recording apparatus 10 on the basis of the determined position so as to read the data from the recording surface 16 (step S153). The data management apparatus 20 then supplies the read data to the terminal where the request for reading the data has issued (step S154).

The operation of each structural element in the data management apparatus 20, which is performed when a request for writing data has been issued from a terminal, will be described in detail.

Figure 9:
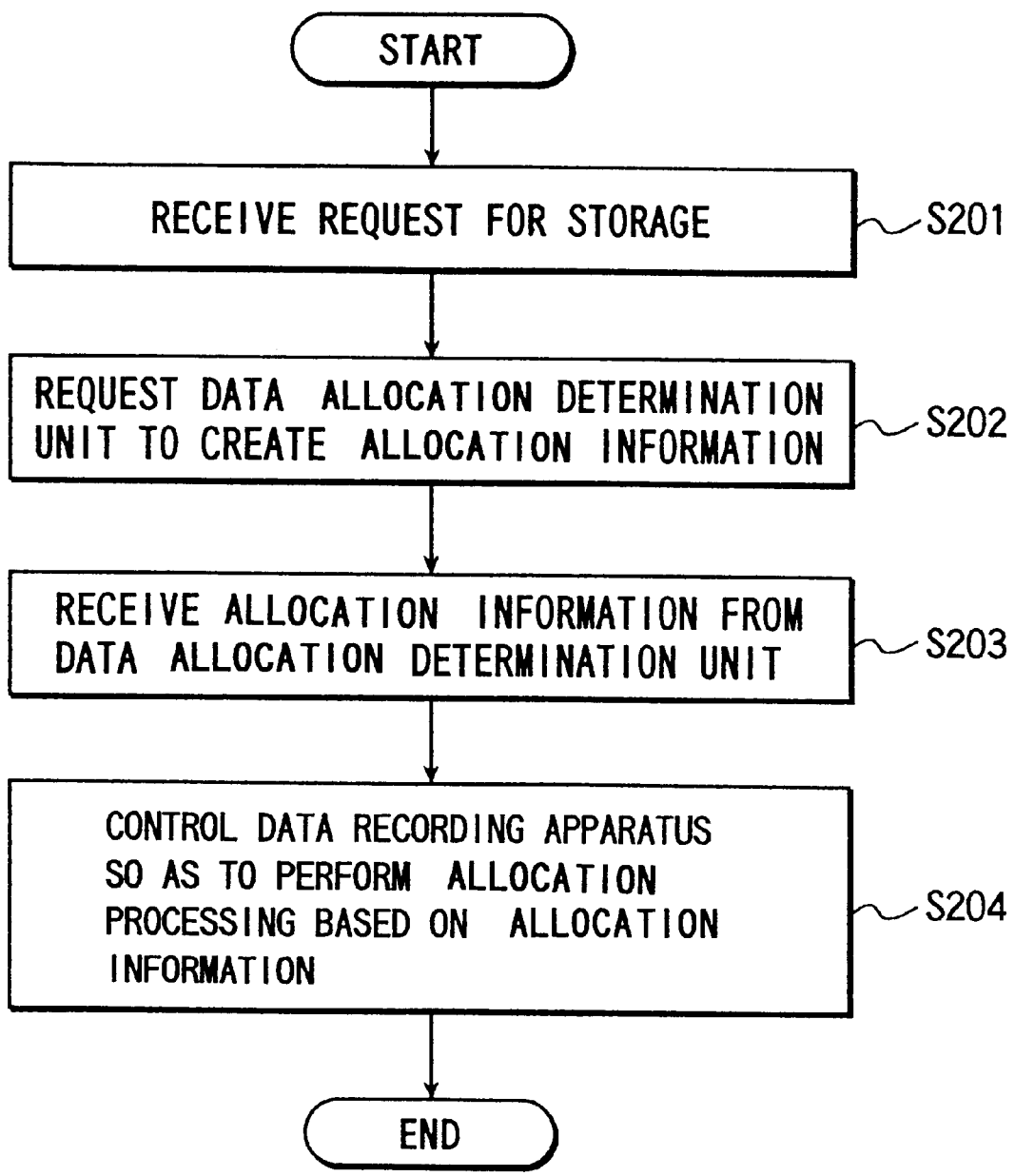
FIG. 9 is a flowchart, illustrating an operation of a data input/output control unit.
Figure 10:
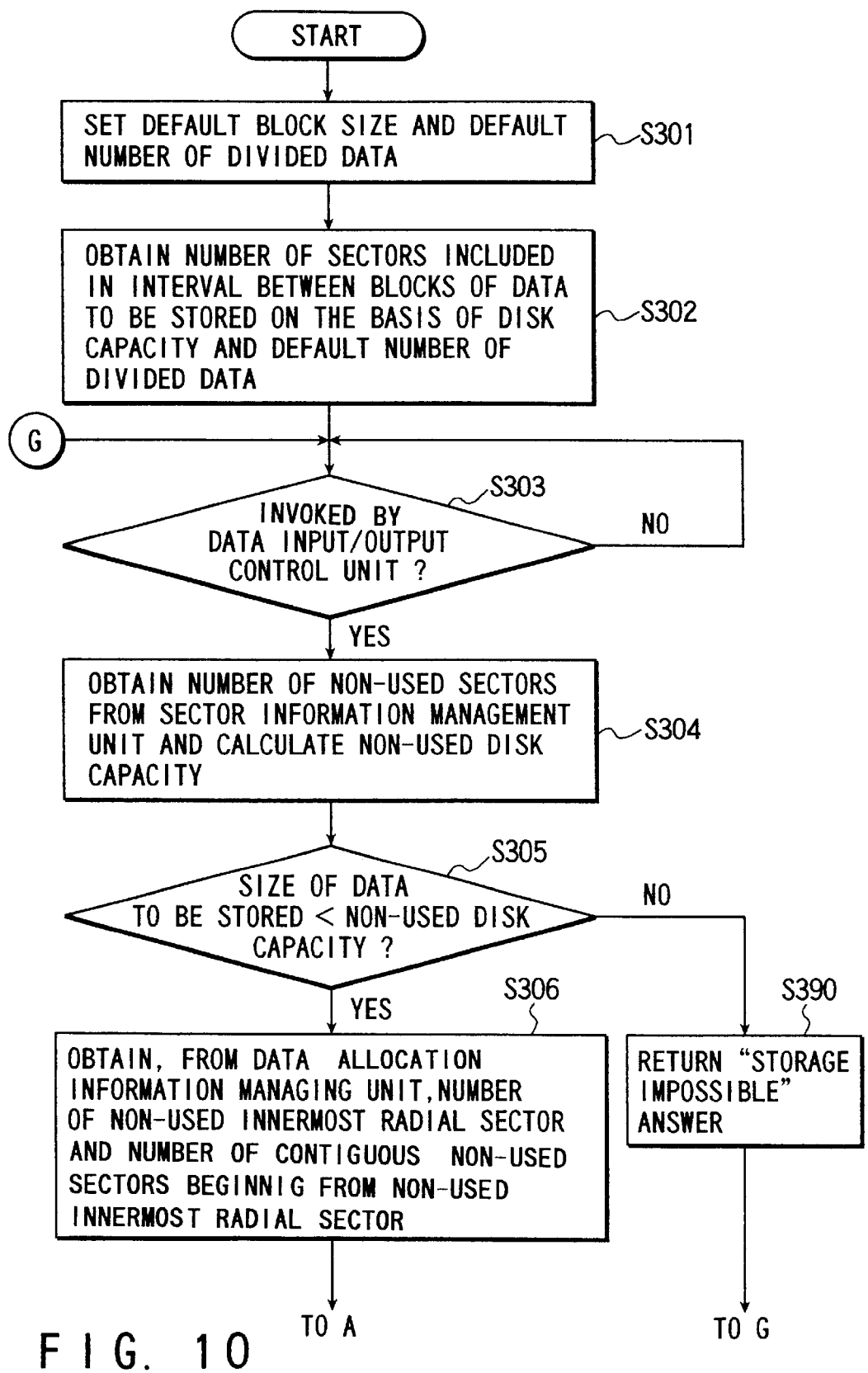
FIG. 10 is a flowchart, illustrating part of an operation of the data allocation determination unit.
Figure 11:
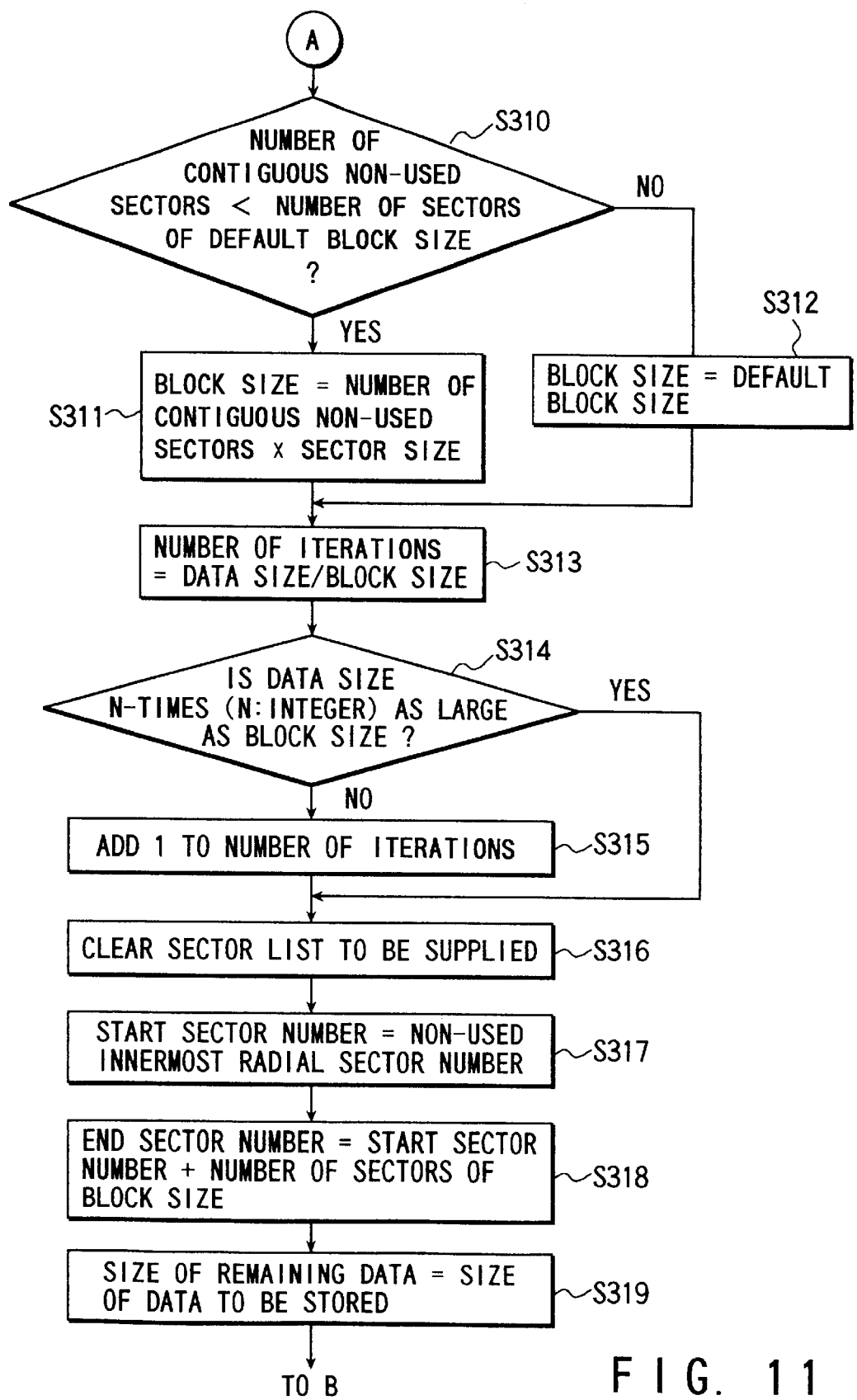
FIG. 11 is a flowchart, illustrating part of an operation of the data allocation determination unit.
Figure 13:
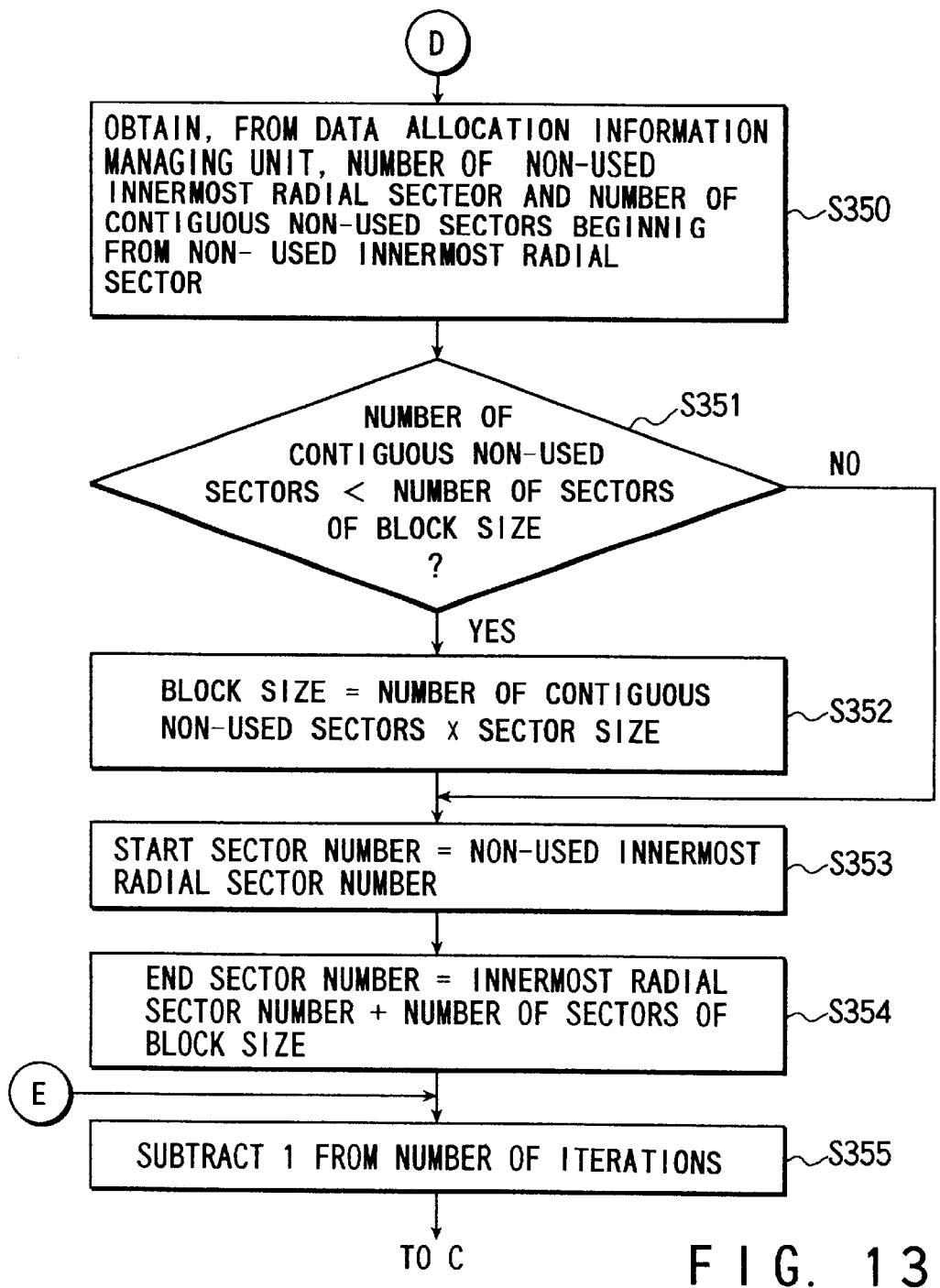
FIG. 13 is a flowchart, illustrating part of an operation of the data allocation determination unit.
Figure 14:
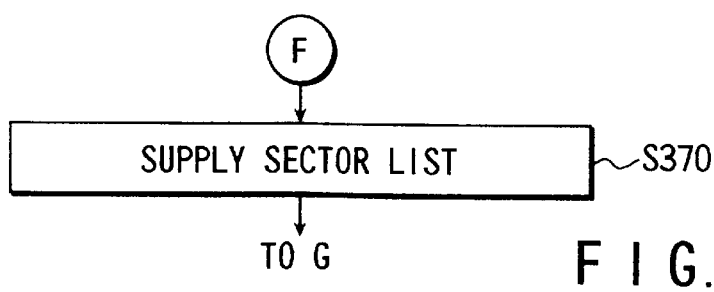
FIG. 14 is a flowchart, illustrating part of an operation of the data allocation determination unit.

Referring first to FIG. 9, the operation of the data input/output control unit 23 will be described.

Upon receiving a request for writing data from a terminal (step S201), the data input/output control unit 23 controls the data allocation determination unit 24 so as to create allocation information which designates the range of allocation on the recording surface 16 of the data to be stored in units of a block (step S202). Upon receiving the allocation information from the data allocation determination unit 24 (step S203), the data input/output control unit 23 controls the data recording apparatus 10 in accordance with the created allocation information so as to sequentially place data blocks on the recording surface 16 (step S204). At this time, the data input/output control unit 23 supplies, in units of predetermined size, data to be stored and sector numbers designated by the sector list, to the data recording control unit 13. For example, the data input/output control unit 23 supplies, in the order to be recorded, a data block and its "start sector number" and "end sector number" to the data recording control unit 13.

FIGS. 10 to 14 illustrate the operation algorithm of the data allocation determination unit 24.

To determine the allocation of data, the "block size" of each block, which is a unit used at the time of storing data in a divided manner, and the "number of divided data", which designates how many blocks the data is divided into, are used as parameters.

As an initialization procedure, the data allocation determination unit 24 sets a "default block size" and the "default number of divided data" (step S301) and calculates the "number of sectors between blocks of data to be stored" on the basis of a "disk capacity" and the "default number of divided data" (step S302).

After the initialization procedure, the data allocation determination unit 24 is kept in a waiting state until it is invoked by the data input/output control unit 23 (step S303). When invoked, the data allocation determination unit 24 obtains the "number of non-used sectors" from the sector information management unit 21, and thereby obtaining the "capacity of non-used region (disk capacity)" based on the "number of non-used sectors" (step S304). The data allocation determination unit 24 compares the "size of data to be stored" with the "non-used region capacity" (step S305), and supplies, when the "size of data to be stored" is larger, the response indicating that the data cannot be stored (step S390). Then, the procedure returns to the step S303.

If it is determined in the step S305 that the "capacity of non-used region" is larger, which indicates that the data can be stored, the data allocation determination unit 24 obtains, from the data allocation information managing unit 22, the number of an innermost non-used sector and the "number of contiguous non-used sectors" beginning from the innermost non-used sector (step S306). The data allocation determination unit 24 then compares the "number of contiguous non-used sectors" with the "number of sectors of the default block size" (step S310), thereby setting the "block size" to the "default block size" when the "number of sectors of the default block size" is smaller (step S312).

If, on the other hand, the "number of sectors of the default block size" is larger, the entire region of the non-used sectors corresponds to a fragmentation, and data of the "default block size" cannot be stored in the non-used sectors. To enable data of one block to be stored in the non-used sectors, the data allocation determination unit 24 sets the "block size" to a value obtained by multiplying the "number of contiguous non-used sectors" by the "sector size" (step S311).

After the step S311 or the step S312, the data allocation determination unit 24 calculates the "number of iterations" (="data size"/"block size")(step S313).

The "number of iterations" corresponds to the number of divided data required for storing targeted data.

If the "data size" is n-times (n: an integer) as large as the "block size" (step S314), the "number of iterations" corresponds to the number obtained in the step S313. On the other hand, if the "data size" is not n-times (n: an integer) as large as the "block size", which means that a fragmentation is included, the data allocation determination unit 24 adds 1 to the "number of iterations" for storing the fragmentation (step S315).

Subsequently, the data allocation determination unit 24 initializes the sector list to be supplied to the data input/output control unit 23 (step S316), sets the "start sector number" to the number of an innermost non-used sector (step S317), sets the "end sector number" to a number obtained by adding the "start sector number" to the "number of sectors of the block size" (step S318), and sets the "size of remaining data" which is not yet stored) as the "size of data to be stored" (step S319).

Thereafter, the data allocation determination unit 24 checks whether or not the "number of iterations" is 0 (step S330). If it is not 0, the unit 24 adds the set "start sector number" and "end sector number" to the sector list (step S331). By referring to this sector list, the data allocation determination unit 24 updates the information stored in the sector information management unit 21 (step S332), updates the information stored in the data allocation information managing unit 22 (step S333), and sets the "remaining data size" to a value obtained by subtracting the "block size" from a "present remaining data size" (step S334).

At this time, the data allocation determination unit 24 determines whether or not the set "remaining data size" is equal to or lower than 0 (step S335). If it is higher than 0, the data allocation determination unit 24 sets the "end sector number" to a number obtained by adding a "present end sector number" to the "number of sectors between data blocks to be stored" (step S336). The data allocation determination unit 24 then compares the set "end sector number" with a "maximum sector number" in the disk (step S337). If the "end sector number" is smaller than the "maximum sector number", which means that more data can be stored, the data allocation determination unit 24 sets the "start sector number" to a number obtained by adding the "present start sector number" to the "number of sectors between data blocks to be stored" (step S338), thereby subtracting 1 from the "number of iterations" (step S355). The procedure then returns to the step S330.

If it is determined in the step S337 that the "end sector number" is larger than the "maximum sector number", which means that data has been stored in the outermost sector, the data allocation determination unit 24 again starts to store data from an innermost non-used sector. The data allocation determination unit 24 obtains, from the data allocation information managing unit 22, the number of an innermost non-used sector and the "number of contiguous non-used sectors" beginning from the innermost non-used sector (step S350). The data allocation determination unit 24 then compares the "number of contiguous non-used sectors" with the "number of sectors of the block size" (step S351). If the "number of contiguous non-used sectors" is smaller than the "number of sectors of the block size", the entire region of non-used sectors corresponds to a fragmentation, which means that data of the "default block size" cannot be stored therein. To enable data of one block to be stored in the non-used sectors, the data allocation determination unit 24 sets the "block size" to a value obtained by multiplying the "number of contiguous non-used sectors" by the "sector size" (step S352), also sets the "start sector number" to the number of an innermost non-used sector (step S353), sets the "end sector number" to a number obtained by adding the "start sector number" to the "number of sectors of the block size" (step S354), and subtracting 1 from the "number of iterations" (step S355). The procedure then returns to the step S330.

If it is determined in the step S330 that the "number of iterations" is 0, which means that all data pieces have been stored, the data allocation determination unit 24 supplies the sector list to the data input/output control unit 23 (step S370). The procedure then returns to the step S303.

If it is determined in the step S335 that the "remaining data size" is equal to or lower than 0, which means that all data pieces have been stored, the data allocation determination unit 24 supplies the sector list to the data input/output control unit 23 (step S370). The procedure then returns to the step S303.

The above-described operation is performed by the data allocation determination unit 24 incorporated in the data management apparatus 20.

Referring then to FIG. 15, the operation of the sector information management unit 21 will be described.

Upon receiving a request from the data allocation determination unit 24 (step S401), the sector information management unit 21 supplies information including the number of currently non-used sectors (step S402). Thereafter, the sector information management unit 21 has its information including the currently non-used sectors updated by the data allocation determination unit 24 (step S403). Then, the procedure then returns to the step S401, where the above-described processing is repeated.

Referring to FIG. 16, the operation of the data allocation information managing unit 22 will be described.

Upon receiving a request from the data allocation determination unit 24 (step S501), the data allocation information managing unit 22 supplies to the data allocation determination unit 24 with the number of an innermost non-used sector on the recording surface 16, and information including the number of sectors in a non-used region beginning from the innermost non-used sector (step S502). Thereafter, the present information stored in the data allocation information managing unit 22 is updated by the data allocation determination unit 24 (step S503). The procedure then returns to the step S501, where the above processing is repeated.

Figure 17:
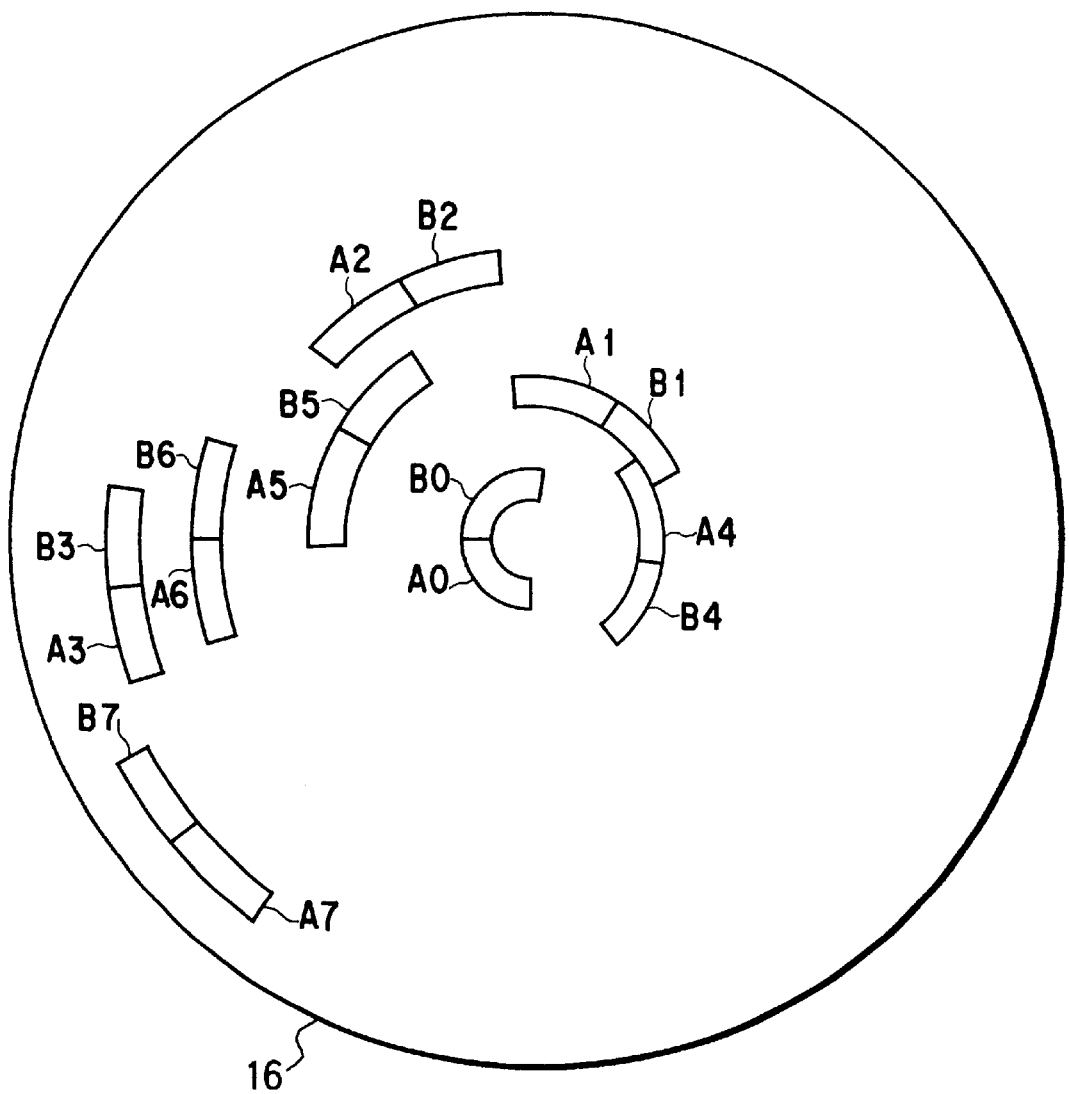
FIG. 17 is a view, showing an allocation of data recorded on a recording surface.

FIG. 17 shows a recording state of the recording surface 16, in which a data group A is divided into eight blocks A0 to A7 and a data group B is divided into eight blocks B0 to B7.

In this example, each data block is stored in the following manner:

First, the blocks A0 to A3 of the blocks A0 to A7 included in the data group A are discretely placed at regular intervals on the recording surface from an inner radial portion thereof to an outer radial portion thereof. When the last block A3 has been placed on an outermost radial portion of the disk, the remaining blocks A4 to A7 are also discretely placed at regular intervals on the recording surface from an inner radial portion thereof to an outer radial portion thereof, similar to the case of the blocks A0 to A3.

After the blocks of the data group A are placed, the blocks of a data group B are placed in the same manner as those of the data group A. In the FIG. 17 case, the blocks B0 to B7 of the data group B are placed adjacent to the blocks A0 to A7 of the data group A, respectively.

The case of employing a plurality of recording surfaces can be similarly dealt with to the case of employing a single recording surface is made for each recording surface in a case where it is monitored from outside.

Since in FIG. 17, the entire blocks of each of the data groups A and B are stored in dispersed regions and not in a contiguous region, the amount of movement of the head can be minimized and the required average seek time can be reduced, even when a request for simultaneously reading the data groups A and B has been issued and hence even when, for example, these data groups are alternately read in units of a block.

As described above, in the first embodiment of the invention, the average seek time can be shortened by appropriately arranging data at the time of storing the same, thereby increasing the speed of reading and writing and hence enabling the data recording apparatus to be used at its maximum.

Further, although the algorithm employed in the data allocation determination unit 24 uses a manner for storing data on the recording surface 16 from an innermost sector to an outermost sector, data may be stored from an outermost sector to an innermost sector, or from a radially intermediate sector. In these cases, it suffices if the algorithm is modified to employ a manner for seeking a sector from an outer radial portion of the recording surface, or from an intermediate radial portion thereof.

(Second Embodiment)

A data recording apparatus according to a second embodiment of the invention will now be described.

Since the basic structure of the system of the second embodiment is similar to that of the apparatus of the first embodiment shown in FIG. 1, no description is given thereof.

FIG. 3 shows the structure of a data management apparatus 20 employed in the second embodiment.

Similar to the case of the first embodiment, the data management apparatus 20 of the second embodiment comprises a sector information management unit 21, a data allocation information managing unit 22, a data input/output control unit 23 and a data allocation determination unit 24.

The sector information management unit 21 manages the state of use of each sector on the recording surface 16 of the recording medium 11. The methods of managing the state of use are as follows: (1) As is shown in FIG. 4, there is provided a method for enabling bit (setting 1) for a used sector S and disabling bit (setting 0) for a non-used sector S, using a bit map 17 having information corresponding to each sector S; and (2) As is shown in FIG. 5, there is provided a method for assigning an identifier to each sector S on the recording surface 16, and managing each sector s being used, using a list (sector's state-of-use management list) 18 in which each sector S being used is denoted by a sector number (sector identifier). The data management apparatus 20 will be further described, supposing that the above method (2) is employed.

The sector information management unit 21 is responsive to a request from the data allocation determination unit 24 for supplying information which includes "the number (ID) of a first non-used (vacant) sector" in a predetermined direction (a radial direction of the recording medium 11) from a reference position on the recording surface 16 (e.g., an outer-most or innermost radial portion of the recording medium 11), and also includes "the number of currently non-used sectors". In this case, concerning the non-used sector number, the number of an innermost or outermost non-used sector on the recording surface 16 is supplied. Alternatively, the number of the non-used sector may be supplied, which is situated inwardly or outwardly closest to an intermediate position between innermost and outermost radial positions on the recording surface. In the second embodiment, in particular, the number of the inner non-used sector may be supplied, which is situated within a partition with a predetermined number (which means each divisional region on the recording surface hereinafter referred to). Hereinbelow, suppose that the number of an innermost non-used sector is supplied. Hereinbelow, suppose that the number of an innermost non-used sector is supplied.

The data allocation information managing unit 22 manages data/sector information as to which sector of the recording surface 16 in the data recording apparatus 10 records which data item. For example, as shown in FIG. 6, a management method of holding a list showing a pair of a start sector number and an end sector number of sectors being used for each data block, may be adopted.

The data/sector information is updated by the data allocation determination unit 24 invoked when the data input/output control unit 23 has received a request for writing data. Further, the data/sector information is referred to when the data input/output control unit 23 has received a request for reading data. The data input/output control unit 23 performs input/output processing in the data recording apparatus 10, upon receiving a request for input/output of data. When receiving a request for writing data (a request for inputting data), the data input/output control unit 23 controls the data allocation determination unit 24 so as to request a sector list indicative of the position in which the data is to be placed. The data input/output control unit 23 also controls the data recording control unit 13 so as to write the data into an appropriate sector.

The data allocation determination unit 24 is invoked by the data input/output control unit 23 so as to determine, based on an instruction from the data input/output control unit 23, in which sector on the recording surface 16 a block of data should be stored, and to supply a determination result to the data input/output control unit 23. In other words, when the data allocation determination unit 24 has received data on the size of to-be-stored data from the data input/output control unit 23, it refers to the information from the data allocation information managing unit 22 and the sector information management unit 21, and supplies the data input/output control unit 23 with the sector list indicative of the order of sectors in which data blocks should be stored.

The sector list supplied from the data allocation determination unit 24 has a format showing sector numbers placed in the order in which sectors denoted by the sector numbers store respective data blocks, or a format showing each pair of "start sector number" and "end sector number" as shown in FIG. 7. If, however, the size of data is too large to store the data in the non-used sectors, the data allocation determination unit 24 returns a "recording impossible" answer.

Further, in the second embodiment, in particular, the data allocation determination unit 24 holds a conversion table for obtaining each divided recording surface portion and the "block size" of data which can be stored therein on the basis of information about "reading speed" or "writing speed" corresponding to a position on the recording surface 16. FIG. 18 shows an example of the conversion table, in which the "number of divided portions" is n. Each divided recording surface portion is hereinafter referred to as a "partition". The procedure using the conversion table will be described later.

The conversion table can be obtained by calculation based on the specifications of the disk and a predetermined "block size". For example, suppose that innermost and outermost radial portions of the recording surface 16 are accessed at a slowest reading/writing speed Vmin and a fastest reading/writing speed Vmax, respectively. Further, suppose that the "number of divided portions" is N and the "block size" of the innermost radial portion is B. Then, the block size Bk of a partition K (an innermost radial partition K is 0) is given by $$Bk = B \times (1 + K \times (Vmax - Vmin)/(N \times Vmin))$$

The algorithm used to store data can be simplified if the recording surface is divided into partitions such that the number of data blocks which can be stored in a partition is equal to that of data blocks which can be stored in any other partition.

Moreover, in the data management apparatus 20 of FIG. 3, data to be read or written is transferred between the data recording apparatus 10 and an external terminal via the data input/output control unit 23.

No description is given of the basic operation of the entire data recording apparatus, since it is the same as that performed in the first embodiment shown in FIGS. 8A and 8B (similarly, the operations of the data input/output control unit 23, the sector information management unit 21 and the data allocation information managing unit 22 are not described).

Figure 19:
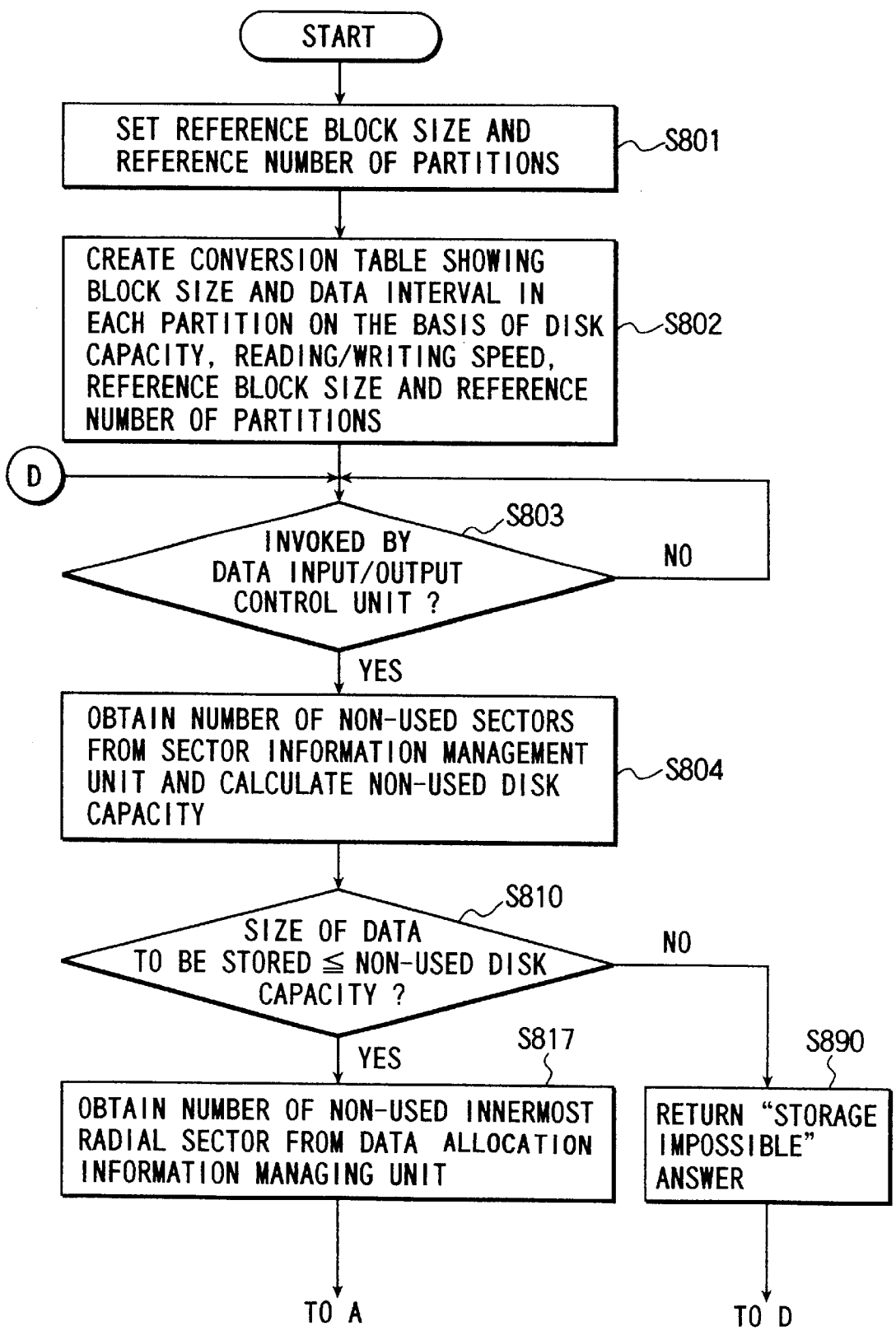
FIG. 19 is a flowchart, illustrating part of an operation of the data allocation determination unit.
Figure 20:
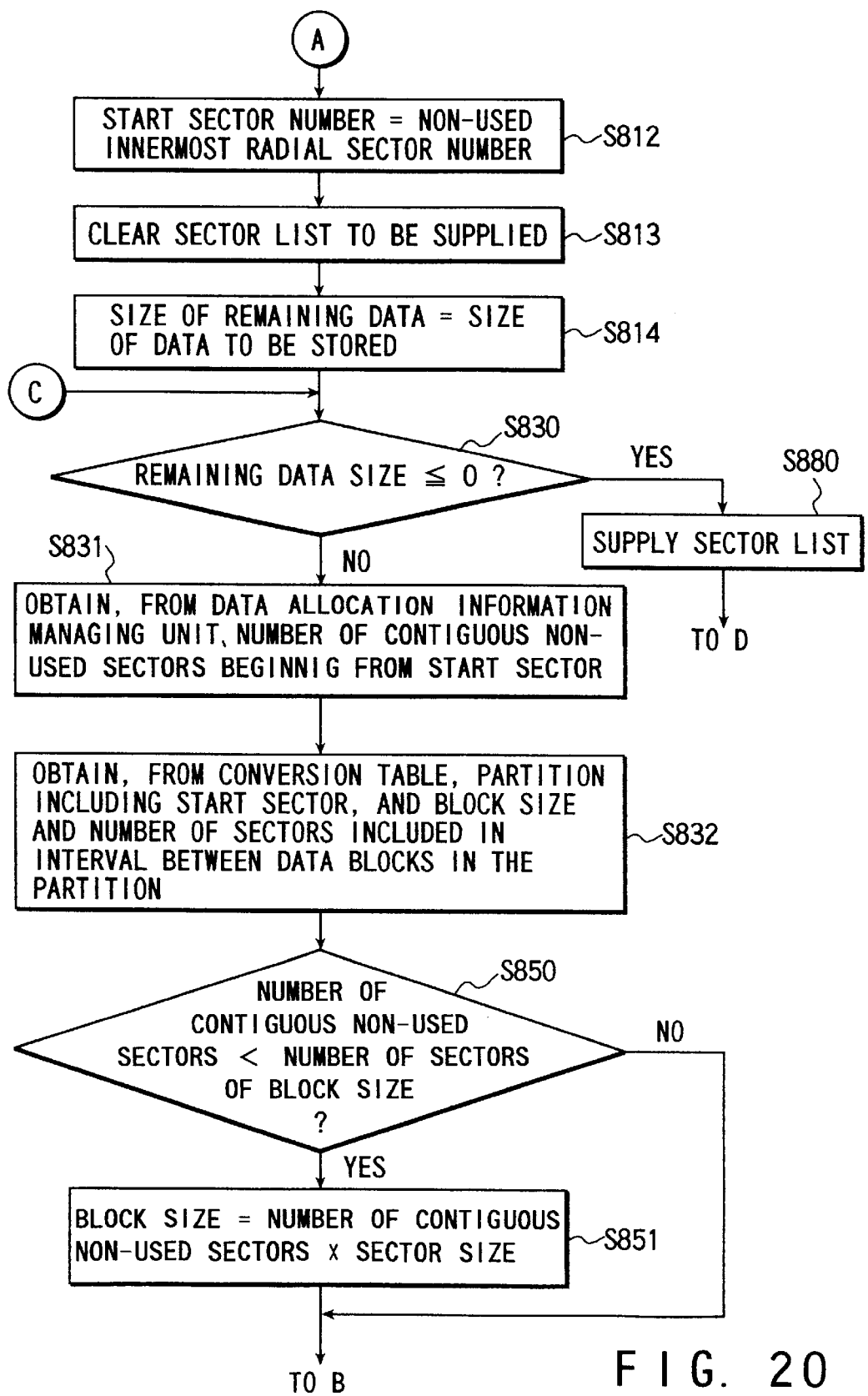
FIG. 20 is a flowchart, illustrating part of an operation of the data allocation determination unit.
Figure 21:
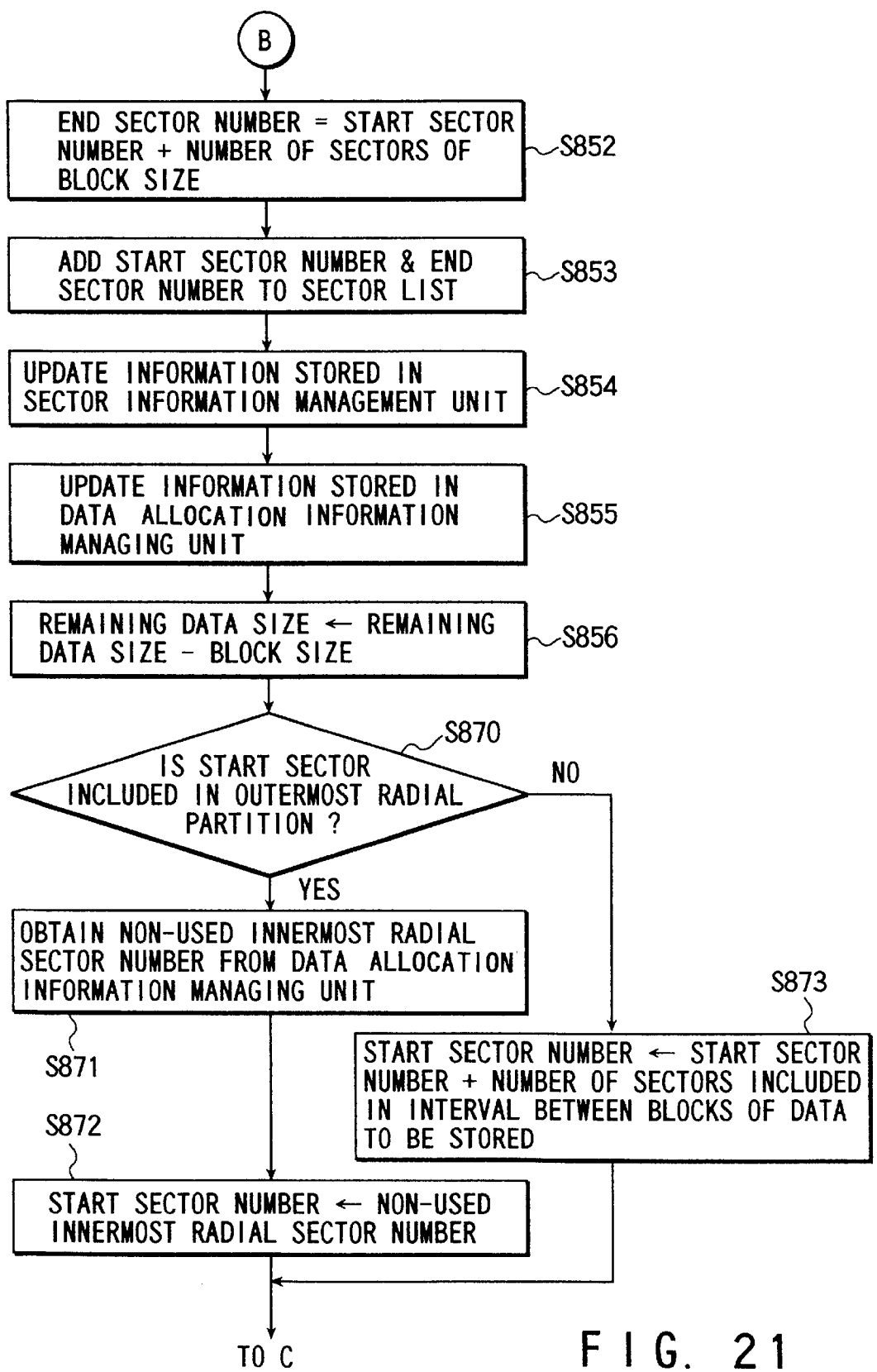
FIG. 21 is a flowchart, illustrating part of an operation of the data allocation determination unit.

Referring then to FIGS. 19 to 21, the operation algorithm used in the data allocation determination unit 24 will be described. Suppose that in this algorithm, the conversion table is prepared by determining the "block size" on the basis of the "number of divided portions" and the reading/writing speed, such that the number of data blocks which can be stored in a partition is equal to that of data blocks which can be stored in any other partition. Moreover, suppose that in the data recording apparatus 10, inner and outer radial portions of the recording surface 16 are accessed at a slower reading/writing speed and a faster reading/writing speed, respectively. That is, under the circumstance where the recording density is uniform and the rotation speed is constant, the accessible number of sectors on outer radial portions in a unit time becomes larger than those on inner radial portions, because the number of sectors on outer radial portions is larger than that on inner radial portions.

As an initializing process, a "block size" and the "number of divided portions (i.e., the number of partitions)" as references are set (step S801), and a conversion table showing a "block size" and a "interval between blocks of data to be stored" in each partition is prepared on the basis of the capacity of the disk, the reading/writing speed values thereof, the "block size" and the "number of partitions" as references (step S802).

The data allocation determination unit 24 is kept in a waiting state until it is invoked by the data input/output control unit 23 (step S803). When invoked, the data allocation determination unit 24 obtains the "number of non-used sectors" from the sector information management unit 21, and thereby obtaining the "capacity of non-used region" based on the "number of non-used sectors" (step S804). The data allocation determination unit 24 compares the "size of data to be stored" with the "non-used region capacity" (step S810), and supplies, when the "size of data to be stored" is larger, the response indicating that the data cannot be stored (step S890). The procedure then returns to the step S803.

If it is determined in the step S810 that the "size of data to be stored" is equal to or smaller than the "capacity of non-used region", the data allocation determination unit 24 obtains, from the data allocation information managing unit 22, the number of an inner-most non-used sector (step S810), thereby setting the obtained number to the "start sector number" (step S812). The data allocation determination unit 24 initializes the sector list (step S816), and sets the "size of remaining data" to the "size of data to be stored" (step S814).

Thereafter, the data allocation determination unit 24 checks whether or not the "size of remaining data" is equal to or less than 0 (step S830). If it is not equal to or less than 0, the unit 24 obtains, from the data allocation information managing unit 22, the "number of contiguous non-used sectors" beginning from the "start sector number" (step S831), and obtains, using the conversion table, a "partition" including the start sector, the "block size" and the "number of sectors between data blocks to be stored" (step S832).

The data allocation determination unit 24 then compares the "number of contiguous non-used sectors" with the "number of sectors of the block size" (step S850). If the "number of contiguous non-used sectors" is smaller than the "number of sectors of the block size", the data allocation determination unit 24 sets the "block size" to a value obtained by multiplying the "sector size" by the "number of contiguous non-used sectors" (step S851).

Then, the data allocation determination unit 24 sets the "end sector number" to a value obtained by adding the "start sector number" to the "number of sectors of the block size" (step S852), thereby adding the set "start sector number" and "end sector number" to the sector list to be supplied (step S853).

Subsequently, the data allocation determination unit 24 updates the information stored in the sector information management unit 21 (step S854), updates the information stored in the data allocation information managing unit 22 (step S855), and sets the "size of remaining data" to a value obtained by subtracting the "block size" from the "size of currently remaining data" (step S856).

The data allocation determination unit 24 checks whether or not the start sector is included in an outermost radial partition (step S870). If it is included in the partition, the unit 24 obtains the number of an innermost non-used sector from the data allocation information managing unit 22 (step S871), and sets the obtained number to the "start sector number" (step S872), thereby returning to the processing in the step S830.

If, on the other hand, it is determined in the step S870 that the start sector is not included in the outermost radial partition, the data allocation determination unit 24 sets the "start sector number" to a number obtained by adding a "present start sector number" to the "number of sectors between blocks of data to be stored" (step S873), thereby returning to the processing in the step S830.

The above-described processing is repeated. If it is determined in the step S830 that the "size of remaining data" is less than 1, the data allocation determination unit 24 transfers the sector list to the data input/output control unit 23 (step S886), thereby returning to the processing in the step S803.

The above-described processing is performed by the data allocation determination unit 24 incorporated in the data management apparatus 20.

The data input/output control unit 23 supplied with the sector list from the data allocation determination unit 24 causes the data recording control unit 13 of the data recording apparatus 10 to store the to-be-stored data in sectors designated in the sector list.

Referring then to the flowchart of FIG. 22, the processing procedure performed in the step S832 using the conversion table will be described in detail.

To obtain a partition which includes a target sector (start sector), a partition number corresponding to the number of the sector is obtained with reference to the conversion table (step S901). For example, if the start sector number is "n1+1", a corresponding partition number is "2". Thereafter, the block size set for the partition which includes the above sector is obtained referring to the conversion table (step S902). In this case, the block size corresponding to the start sector number "n1+1" is "b2". Further, the "number of sectors between data blocks of data to be stored", which will be used in a later process, is obtained (step S903). In this case, the number of the sectors is "N2".

Figure 23:
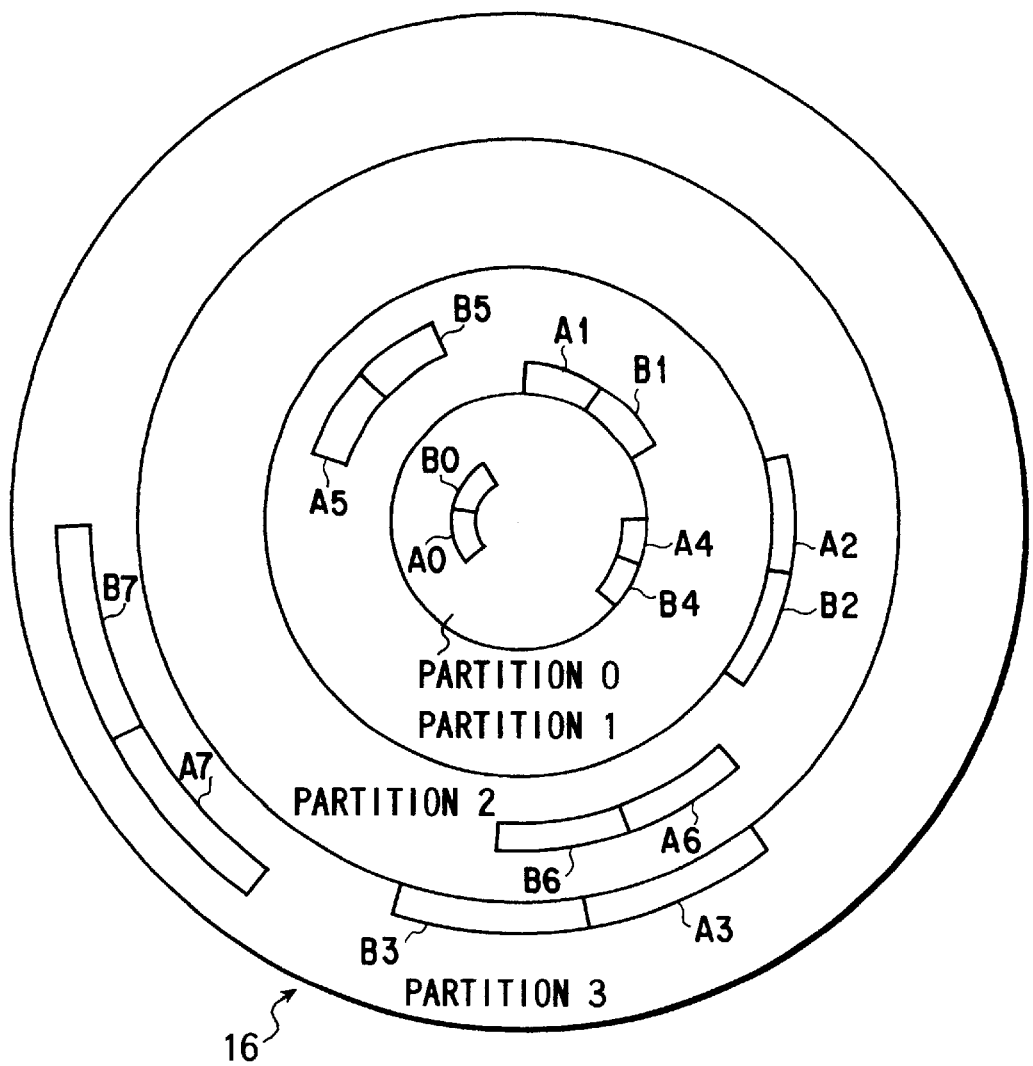
FIG. 23 is a view, showing an allocation of data recorded on the recording surface.

FIG. 23 shows a recording state of the recording surface 16, in which a data group A is divided into eight blocks A0 to A7 and a data group B is divided into eight blocks B0 to B7.

In this example, each block of data is stored in the following manner:

First, the blocks A0 to A3 of the blocks A0 to A7 included in the data group A are discretely placed at regular intervals (in units of a partition) on the recording surface from an inner radial portion thereof to an outer radial portion thereof. When the last block A3 has been placed on an outermost radial portion of the disk, the remaining blocks A4 to A7 are also discretely placed at regular intervals (in units of a partition) on the recording surface from an inner radial portion thereof to an outer radial portion thereof, similar to the case of the blocks A0 to A3.

After the blocks of the data group A are placed, the blocks of the data group B are placed in the same manner as those of the data group A. In the FIG. 17 case, the blocks B0 to B7 of the data group B are placed adjacent to the blocks A0 to A7 of the data group A, respectively.

Also where the data recording apparatus 10 employs a plurality of recording surfaces, data allocation similar to the case of employing a single recording surface is made for each recording surface.

Since in FIG. 23, the entire blocks of each of the data groups A and B are stored in dispersed regions and not in a continuous region, the amount of movement of the head can be minimized and the required average seek time can be reduced, even when a request for simultaneously reading the data groups A and B has been issued and hence even when, for example, these data groups are alternately read in units of a block. Moreover, since the blocks of data are placed to have sizes corresponding to the respective speed values of access (writing or reading speed values) which are determined by the positions of the blocks on the recording surface, the time required for reading or writing can be kept substantially constant irrespective of the positions of the blocks, and therefore a substantially constant throughput can be realized.

As described above, in the second embodiment of the invention, the average seek time can be shortened by appropriately arranging data at the time of storing the same, thereby increasing the speed of reading/writing and making constant the time required for reading/writing. As a result, the data recording apparatus can be used at its maximum.

Further, although the algorithm employed in the data allocation determination unit uses a manner for storing data on the recording surface from an innermost sector to an outermost sector, data may be stored from an outermost sector to an innermost sector, or from a radially intermediate sector. In these cases, it suffices if the algorithm is modified to employ a manner for seeking a sector from an outer radial portion of the recording surface, or from an intermediate radial portion thereof.

To store a series of data items, the first and second embodiments employ a procedure (an algorithm used in the data allocation determination unit) for successively determining the position of each of the data items. For example, in the FIG. 17 or 23 case, the allocation of the data group A is determined first, and then that of the data group B is determined. This allocation procedure can be modified such that the positions of the series of data items are simultaneously determined.

In addition, although in the first and second embodiments, a single data recording apparatus 10 is connected to the data management apparatus 20, a plurality of data recording apparatuses 20 can be connected to the same as shown in FIG. 24. In this case, it suffices if the sector information management unit 21, the data allocation information managing unit 22 and the data allocation determination unit 24 are adapted to manage information necessary for each data recording apparatus 10, while the data input/output control unit 23 is adapted to perform input/output control of a corresponding one of the data recording apparatuses 10.

The first and second embodiments are applicable to a data server apparatus for providing a series of data items, such as a video server apparatus for use in a video-on-demand (VOD) system.

Figure 25:
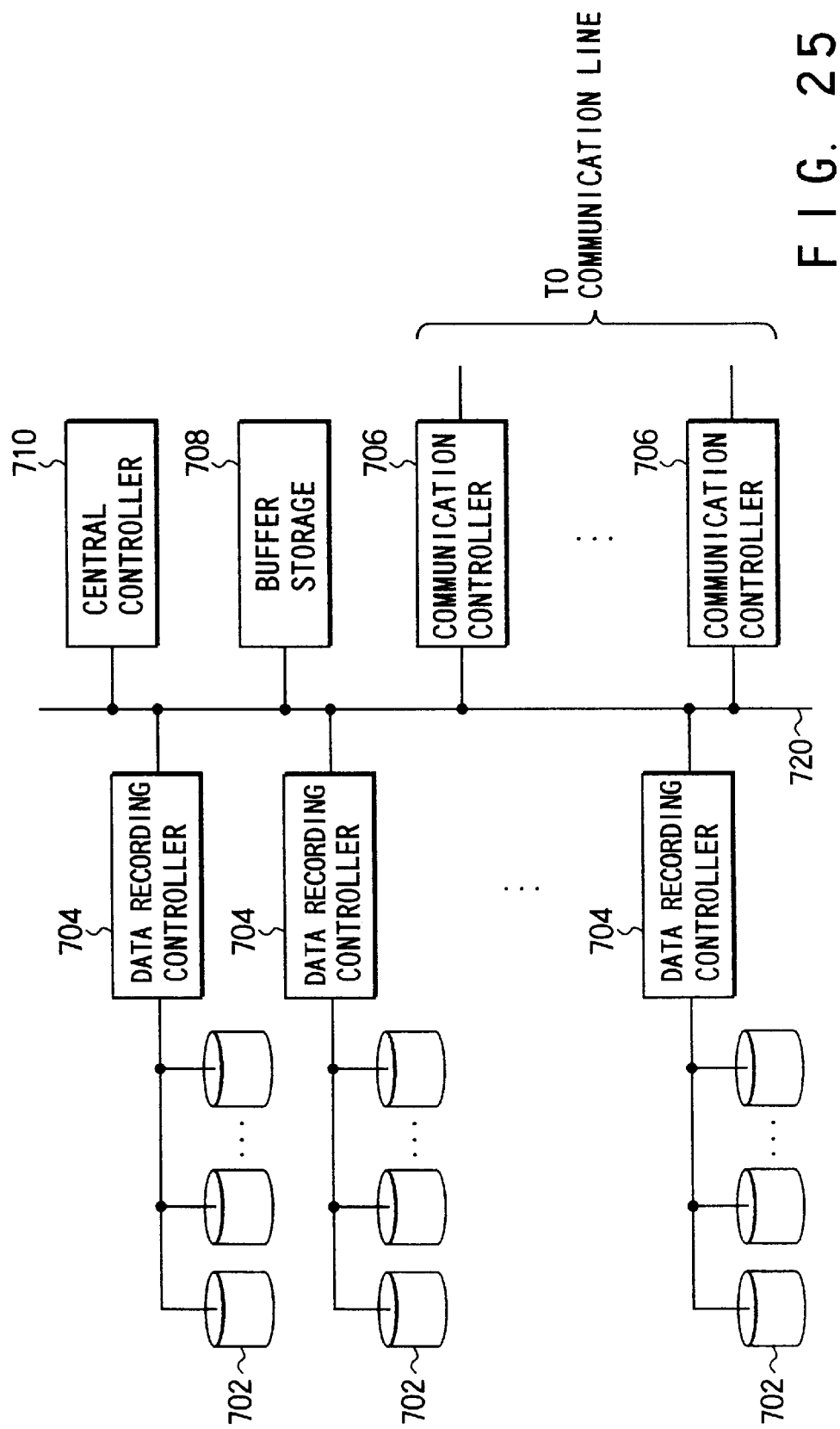
FIG. 25 is a view, showing a video server apparatus to which the invention is applied.

FIG. 25 shows an example of a video server to which the first and second embodiment are applicable. In brief, the video server receives, at an arbitrary time, a request from an arbitrary terminal for supplying video data thereto, reads the requested data from a data recording apparatus employed therein and storing a series of video data items such as movie data, etc., and simultaneously and sequentially supplies the terminal with the read data in real time.

In FIG. 25, a request for accessing video data issued from a user or an application program, etc. is supplied via inter-process communication, network communication, etc. This request for access is transferred from a communication controller 706 to a central controller 710 via a bus 720. The central controller 710 controls a necessary one of data recording controllers 704 so as to read the requested video data. The data recording controller 704 reads the video data from a corresponding one of data recording units 702, and writes the read data into a buffer memory 708. The central controller 710 controls the communication controller 706 so as to send the video data in the buffer memory 708. The communication controller 706 sends the video data to a terminal where the request for access has issued. The central controller 710 is constituted of e.g. a CPU which executes a program describing a control procedure.

To store data in the data recording unit 702, the data recording controller 704 receives a request for writing and data to be written, and causes a predetermined one of the data recording units 702 to record the data.

By providing the data management apparatus 20 according to the first or second embodiment (shown in FIG. 3 or 24) in the data recording controller 704 of the video server apparatus constructed as above, data can be recorded on the recording surface of each data recording apparatus 10 in a manner as described in the first or second embodiment.

The data allocation apparatus 20 may be provided in the central controller 710.

FIG. 25 merely shows an example of the structure of the data server apparatus. The present invention is applicable to data server apparatuses of various structures. In other words, the present invention is applicable not only to a video server apparatus which handles video data, but also to another type of server apparatus which handles groups of data items.

As described above in detail, according to the present invention, even in a case where a series of data items must sequentially be accessed in predetermined access units, e.g., in units of a data block, a situation where the distance for seeking target sectors continuously increases can be avoided and hence the required average seek time can be minimized, since each of the data items is divided into a plurality of data blocks and arranging the blocks in dispersed regions of the recording surface.

Furthermore, in a case where the reading/writing speed varies depending upon the recording position of data on the recording surface of the data recording apparatus, the present invention can realize a constant throughput and a minimum average seek time by storing a data block of a large size in a region in which the reading/writing speed is high, and storing a data block of a small size in a region in which the reading/writing speed is low. Therefore, the data recording apparatus according to the invention can be used at its maximum.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data allocation control method applicable to a data recording apparatus for writing and/or reading data to/from a disciform recording medium, the method comprising:

dividing first data to be written to the recording medium into a plurality of data blocks to be consecutively dealt with; and generating allocation information for designating each location of the plurality of data blocks, such that a second data block subsequent to a first data block included in the plurality of data blocks is located to define an interval from a location of the first data block on a continuous memory area, such that a third data block belonging to second data that is different from the first data is located on the continuous memory area between the location of the first data block and a location of the second data block, and such that during operation of the disciform recording medium:
1) at least one data block from the first data is encountered between two consecutive data blocks from the second data, and
2) at least one data block from the second data is encountered between two consecutive data blocks from the first data.

2. A data allocation control method applicable to a data recording apparatus for writing and/or reading data to/from a disciform recording medium, the method comprising:
dividing first data to be written to the recording medium into a plurality of data blocks to be consecutively dealt with;
generating first allocation information for designating a location of a first data block included in the plurality of data blocks; and
generating second allocation information for designating a location of a second data block subsequent to the first data block, such that the second data block is located to define an interval from the location of the first data block on a continuous memory area, such that a third data block belonging to second data that is different from the first data is located on the continuous memory area between the location of the first data block and a location of the second data block, and such that during operation of the disciform recording medium:
1) at least one data block from the first data is encountered between two consecutive data blocks from the second data, and
2) at least one data block from the second data is encountered between two consecutive data blocks from the first data.

3. The method according to claim 2, further comprising:
controlling the data recording apparatus to locate each data block in accordance with each of the first and second allocation information.

4. A data allocation control method applicable to a data recording apparatus for executing positioning control by rotating a disciform recording medium and by moving a head in a radial direction of the recording medium, and for writing and/or reading data to/from the recording medium to which the head is positioned, the method comprising:
dividing first data to be written to the recording medium into a plurality of data blocks to be consecutively dealt with;
generating first allocation information for designating a location of a first data block included in the plurality of data blocks;
generating second allocation information for designating a location of a second data block subsequent to the first data block, such that the second data block is located to define an interval from the location of the first data block on a continuous memory area, such that a third data block belonging to second data that is different from the first data is located on the continuous memory area between the location of the first data block and a location of the second data block, and such that during operation of the disciform recording medium:
1) at least one data block from the first data is encountered by the head between two consecutive data blocks from the second data, and
2) at least one data block from the second data is encountered by the head between two consecutive data blocks from the first data; and
controlling to move the head to each of the locations designated by the first and second allocation information.

5. The method according to claim 1, wherein the allocation information includes a sector list in which each location of data blocks is represented by sector identifiers assigned to sectors of the recording surface.

6. The method according to claim 5, wherein:
each location of data blocks is represented by a start sector identifier and an end sector identifier.

7. The method according to claim 1, wherein each of the intervals between the data blocks is determined based on a predetermined number of sectors.

8. The method according to claim 1, further comprising generating size information designating a size of each data block, such that:
data blocks to be located in a region where access speed is higher are designated to have a large size, and
data blocks to be located in a region where the access speed is lower are designated to have a small size.

9. The method according to claim 8, wherein:
the size information includes a conversion table for obtaining the data block size on the basis of a location of the corresponding data block.

10. A data allocation control method applicable to a data recording apparatus writing and/or reading data to/from a recording surface of a disciform recording medium, the method comprising:
dividing data to be recorded on the recording surface into a plurality of data blocks to be consecutively dealt with; and
generating size information for designating respective sizes of each data blocks, such that:
1) data blocks to be located in a region where access speed is higher are designated to have a large size, and
2) data blocks to be located in region where the access speed is lower are designated to have a small size.

11. A data server apparatus applicable to a data recording apparatus for writing and/or reading data to/from a disciform recording medium, the data server apparatus comprising:
a unit configured to divide first data to be written to the recording medium into a plurality of data blocks to be consecutively dealt with;
a unit configured to generate allocation information for designating each location of the plurality of data blocks, such that a second data block subsequent to a first data block included in the plurality of data blocks is located to define an interval from a location of the first data block on a continuous memory area, such that a third data block belonging to second data that is different from the first data is located on the continuous memory area between the location of the first data block and a location of the second data block, and such that during operation of the disciform recording medium:
1) at least one data block from the first data is encountered between two consecutive data blocks from the second data, and
2) at least one data block from the second data is encountered between two consecutive data blocks from the first data;
a unit configured to control the data recording apparatus to place each data block in accordance with the allocation information; and a unit configured to respond to a request for reading data, read data blocks from the recording medium and transfer data comprised of the read data blocks to a terminal where the request has issued.

12. A data server apparatus applicable to a data recording apparatus for writing and/or reading data to/from a disciform recording medium, the data server apparatus comprising:

a unit configured to divide first data to be recorded to the recording medium into a plurality of data blocks to be consecutively dealt with;

a unit configured to generate first allocation information for designating a location of a first data block included in the plurality of data blocks;

a unit configured to generate second allocation information for designating a location of a second data block subsequent to the first data block, such that the second data block is located to define an interval from the location of the first data block on a continuous memory area, such that a third data block belonging to second data that is different from the first data to be located on the continuous memory area between the location of the first data block and a location of the second data block, and such that during operation of the disciform recording medium:

1) at least one data block from the first data is encountered between two consecutive data blocks from the second data, and 2) at least one data block from the second data is encountered between two consecutive data blocks from the first data;

a unit configured to control the data recording apparatus to place each data block in accordance with each of the first and second allocation information; and a unit configured to respond to a request for reading data, read data blocks from the recording medium and transfer data comprised of the read data blocks to a terminal where the request has issued.

13. A data server apparatus applicable to a data recording apparatus for executing positioning control by rotating a disciform recording medium and by moving a head in a radial direction of the recording medium, and writing and/or reading data to/from the recording medium to which the head is positioned, the data server apparatus comprising:

a unit configured to divide first data to be recorded to the recording medium into a plurality of data blocks to be consecutively dealt with;

a unit configured to generate first allocation information for designating a location of a first data block included in the plurality of data blocks; and a unit configured to generate second allocation information for designating a location of a second data block subsequent to the first data block, such that the second data block is located to define an interval from the location of the first data block on a continuous memory area, such that a third data block belonging to second data that is different from the first data is located on the continuous memory area between the location of the first data block and a location of the second data block, and such that during operation of the disciform recording medium:

1) at least one data block from the first data is encountered by the head between two consecutive data blocks from the second data, and 2) at least one data block from the second data is encountered by the head between two consecutive data blocks from the first data;

a unit configured to control to move the head to each of the locations designated by the first and second allocation information; and a unit configured to respond to a request for reading data, read data blocks from the recording medium and transfer data comprised of the read data blocks to a terminal where the request has issued.

14. In a disciform recording medium to which data has been written, the data comprising:

a plurality of data blocks belonging to first data, wherein a second data block subsequent to a first data block included in the plurality of data blocks is located to define an interval from a location of the first data block on a continuous memory area; and a third data block belonging to second data that is different from the first data and located on the continuous memory area between the location of the first data block and the location of a second data block, such that during operation of the disciform recording medium:

1) at least one data block from the first data is encountered between two consecutive data blocks from the second data, and 2) at least one data block from the second data is encountered between two consecutive data blocks from the first data.

15. A method of recording onto a disciform recording medium divided into sectors, first data having a plurality of first data blocks and second data having a plurality of second data blocks, the method comprising:

a) placing the first data blocks discretely on a first plurality of sectors so as to separate the first data blocks from each other by first intervals of at least one sector; and b) placing the second data blocks discretely on a second plurality of sectors that are different from the first plurality of sectors, so as to separate the second data blocks from each other by second intervals of at least one sector, such that during operation of the disciform recording medium:

1) at least one first data block is encountered between two consecutive second data blocks, and 2) at least one second data block is encountered between two consecutive first data blocks.

16. The method of claim 15, wherein the placing of the first and second data blocks includes:

placing the first and second data blocks based on information including a start sector number and an end sector number for each data block.

17. The method of claim 15, wherein the placing of the first and second data blocks includes:

placing the first and second data blocks based on information related to contiguous non-used sectors.

18. The method of claim 15, wherein:

each first interval corresponds to a predetermined number of sectors.

19. A method of recording onto a disciform recording medium divided into sectors, first data having a plurality of first data blocks and second data having a plurality of second data blocks, the method comprising:

a) placing the first data blocks discretely on a first plurality of sectors so as to separate the first data blocks from each other by first intervals of at least one sector; and b) placing the second data blocks discretely on a second plurality of sectors that are different from the first plurality of sectors, so as to separate the second data blocks from each other by second intervals of at least one sector;

wherein the placing of the first and second data blocks is based on information that designates each data block's size, so that the placing of the first and second data blocks includes:

1) in regions of the disciform recording medium with higher access speed, placing data blocks of larger size; and 2) in regions of the disciform recording medium with lower access speed, placing data blocks of smaller size.

* * * * *

UNITED STATES PATENT AND TRADEMARK OFFICE
CERTIFICATE OF CORRECTION

| | |
|---|---|
| PATENT NO. | : 6,314,232 B1 |
| DATED | : November 6, 2001 |
| INVENTOR(S) | : Kizu et al. |

It is certified that error appears in the above-identified patent and that said Letters Patent is hereby corrected as shown below:

<u>Title page,</u>
Item [45], and the Notice information should read:

-- [45] Date of Patent:  *Nov. 6, 2001 --

-- [*]  Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-third Day of April, 2002

Attest:

JAMES E. ROGAN
*Attesting Officer*       *Director of the United States Patent and Trademark Office*